US012743602B2

(12) United States Patent
Akino et al.

(10) Patent No.: US 12,743,602 B2
(45) Date of Patent: Sep. 22, 2026

(54) AUTOMATED VARIATIONAL INFERENCE USING STOCHASTIC MODELS WITH IRREGULAR BELIEFS

(71) Applicant: Mitsubishi Electric Research Laboratories, Inc., Cambridge, MA (US)

(72) Inventors: Toshiaki Koike Akino, Belmont, MA (US); Ye Wang, Andover, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 837 days.

(21) Appl. No.: 18/159,516

(22) Filed: Jan. 25, 2023

(65) Prior Publication Data

US 2023/0419075 A1 Dec. 28, 2023

Related U.S. Application Data

(60) Provisional application No. 63/366,936, filed on Jun. 24, 2022.

(51) Int. Cl.
*G06N 3/04* (2023.01)
*G06N 3/0455* (2023.01)
*G06N 3/047* (2023.01)

(52) U.S. Cl.
CPC ............. *G06N 3/04* (2013.01); *G06N 3/0455* (2023.01); *G06N 3/047* (2023.01)

(58) Field of Classification Search
CPC ......... G06N 3/04; G06N 3/0455; G06N 3/047
See application file for complete search history.

(56) References Cited

U.S. PATENT DOCUMENTS 8,885,928 B2 11/2014 Forman
10,510,002 B1 * 12/2019 Olabiyi ................ G06N 3/0499
(Continued)

FOREIGN PATENT DOCUMENTS

WO 2022004057 A1 1/2022

OTHER PUBLICATIONS

Blundell et al., Weight Uncertainty in Neural Networks, May 2015 (Year: 2015).*

(Continued)

*Primary Examiner* — Tamara T Kyle
*Assistant Examiner* — Jacqueline C. Meyer
(74) *Attorney, Agent, or Firm* — Gene Vinokur

(57) ABSTRACT

A system and method for automated construction of a stochastic deep neural network (DNN) architecture is provided. The framework of invention automatically searches for most relevant stochastic modes underlaying datasets for variational Bayesian inference. The invention provides a way to use heterogenous, irregular, and mismatched beliefs in stochastic sampling for intermediate representation in DNNs with a capability of an automatically tuning mechanism of posterior, prior, and likelihood models to enable accurate generative models and uncertainty models for machine learning tasks. The system further allows adjustable discrepancy measure to regularize intermediate representation by variants of divergence metrics including Renyi's alpha, beta, and gamma divergences. The invention enables diverse mixture combinations of stochastic models for misspecified and unspecified probabilistic relations in an automatic fashion. Accordingly, the representation capability of variational autoencoders, variational information bottlenecks, denoising diffusion probabilistic models and other stochastic DNNs are improved.

20 Claims, 15 Drawing Sheets

(56) References Cited

U.S. PATENT DOCUMENTS

| | | | | |
|---|---|---|---|---|
| 10,592,386 | B2 | 3/2020 | Walters et al. | |
| 10,872,296 | B2 | 12/2020 | Alemi | |
| 2015/0242745 | A1* | 8/2015 | Wang | G06N 3/049 706/25 |
| 2018/0046939 | A1 | 2/2018 | Meron et al. | |
| 2019/0026631 | A1 | 1/2019 | Carr et al. | |
| 2020/0401916 | A1* | 12/2020 | Rolfe | G06N 3/0455 |
| 2021/0019603 | A1* | 1/2021 | Friedman | G06N 3/047 |
| 2023/0141655 | A1* | 5/2023 | Gonzalez | G06N 3/045 706/13 |
| 2024/0086716 | A1* | 3/2024 | Su | G06N 3/084 |

OTHER PUBLICATIONS

Krasser, Variational Inference in Bayesian Neural Networks, Mar. 2019 (Year: 2019).*

Maclaurin et al., Gradient-based Hyperparameter Optimization through Reversible Learning, Apr. 2015 (Year: 2015).*

Thiam et al., Multi-Modal Pain Intensity Assessment Based on Physiological Signals: A Deep Learning Perspective, Sep. 2021 (Year: 2021).*

Wilson et al., Bayesian Deep Learning and a Probabilistic Perspective of Generalization, 2020 (Year: 2020).*

Burda et al., Importance Weighted Autoencoders, Nov. 2016 (Year: 2016).*

Demir, Automated Bayesian Network Exploration for Nuisance-Robust Inference, Jan. 2022 (Year: 2022).*

Finke and Thiery, On importance-weighted autoencoders, Sep. 2019 (Year: 2019).*

Pavlovic et al., Multi-subject Stochastic Blockmodels for adaptive analysis of individual differences in human brain network cluster structure, Jan. 2020 (Year: 2020).*

Knoblauch J, Jewson J, Damoulas T. Generalized variational inference: Three arguments for deriving new posteriors. arXiv preprint arXiv:1904.02063. Apr. 3, 2019.

* cited by examiner

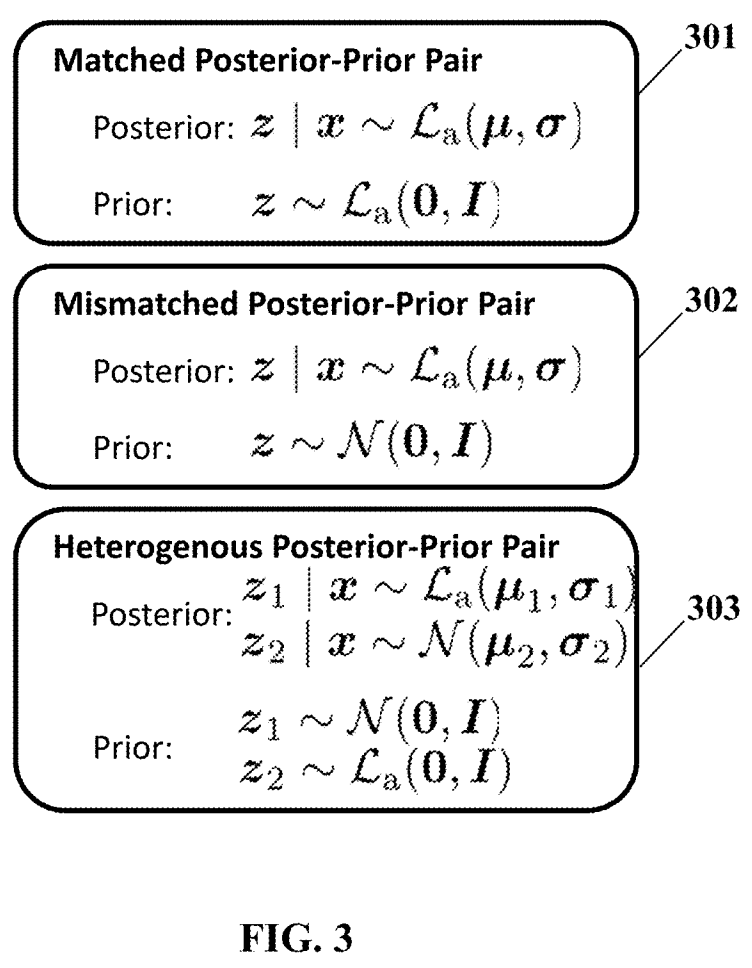

301

Matched Posterior-Prior Pair

Posterior: $\boldsymbol{z} \mid \boldsymbol{x} \sim \mathcal{L}_{\mathrm{a}}(\boldsymbol{\mu}, \boldsymbol{\sigma})$ Prior: $\boldsymbol{z} \sim \mathcal{L}_{\mathrm{a}}(\mathbf{0}, \boldsymbol{I})$

302

Mismatched Posterior-Prior Pair

Posterior: $\boldsymbol{z} \mid \boldsymbol{x} \sim \mathcal{L}_{\mathrm{a}}(\boldsymbol{\mu}, \boldsymbol{\sigma})$ Prior: $\boldsymbol{z} \sim \mathcal{N}(\mathbf{0}, \boldsymbol{I})$

303

Heterogenous Posterior-Prior Pair

Posterior: $\boldsymbol{z}_1 \mid \boldsymbol{x} \sim \mathcal{L}_{\mathrm{a}}(\boldsymbol{\mu}_1, \boldsymbol{\sigma}_1)$ $\boldsymbol{z}_2 \mid \boldsymbol{x} \sim \mathcal{N}(\boldsymbol{\mu}_2, \boldsymbol{\sigma}_2)$ Prior: $\boldsymbol{z}_1 \sim \mathcal{N}(\mathbf{0}, \boldsymbol{I})$ $\boldsymbol{z}_2 \sim \mathcal{L}_{\mathrm{a}}(\mathbf{0}, \boldsymbol{I})$

FIG. 3

PROBABILITY DISTRIBUTION NOTATION AND PDF

| Distribution | Notation | PDF $f(x)$ |
|---|---|---|
| Normal | $\mathcal{N}(\mu, \sigma)$ | $\frac{1}{\sqrt{2\pi\sigma^2}} \exp\left(-\frac{(x-\mu)^2}{2\sigma^2}\right).$ |
| Laplace | $\mathcal{L}_a(\mu, \sigma)$ | $\frac{1}{2\sigma} \exp\left(-\frac{\lvert x-\mu\rvert}{\sigma}\right)$ |
| Cauchy | $\mathcal{C}(\mu, \sigma)$ | $\frac{1}{\pi} \frac{\sigma}{\sigma^2+(x-\mu)^2}$ |
| Logistic | $\mathcal{L}_o(\mu, \sigma)$ | $\frac{1}{\sigma}\left(\exp\left(\frac{x-\mu}{2\sigma}\right) + \exp\left(\frac{\mu-x}{2\sigma}\right)\right)^{-2}$ |
| Uniform | $\mathcal{U}(\mu, \sigma)$ | $\frac{1}{2\sigma}, \quad \mu-\sigma \leq x \leq \mu+\sigma$ |
| Gumbel | $\mathcal{G}(\mu, \sigma)$ | $\frac{1}{\sigma} \exp\left(-\frac{x-\mu}{\sigma} - \exp\left(-\frac{x-\mu}{\sigma}\right)\right)$ |
| Exponential | $\mathcal{E}(\sigma)$ | $\frac{1}{\sigma} \exp\left(-\frac{x}{\sigma}\right), \quad x \geq 0$ |
| Bernoulli | $\mathcal{B}(\lambda)$ | $\lambda^x (1-\lambda)^{1-x}, \quad x \in \{0, 1\}$ |
| Cont. Bernoulli [4] | $\mathcal{CB}(\lambda)$ | $C(\lambda)\lambda^x (1-\lambda)^{1-x}, \quad 0 \leq x \leq 1$ |
| Beta | $\mathcal{B}_e(\lambda, \gamma)$ | $\frac{\Gamma(\lambda+\gamma)}{\Gamma(\lambda)\Gamma(\gamma)} x^{\lambda-1}(1-x)^{\gamma-1}$ |

FIG. 4A $$D_{\mathrm{KL}}(Q \| \Pi) = \mathop{\mathbb{E}}_{z \sim Q}\left[\log\left(\frac{Q(z)}{\Pi(z)}\right)\right]$$

| Posterior $Q$ | Prior $\Pi$ | KLD $D_{\mathrm{KL}}(Q\|\Pi)$ |
|---|---|---|
| $\mathcal{N}(\mu,\sigma)$ | $\mathcal{N}(0,1)$ | $\frac{1}{2}\left(\mu^2+\sigma^2-1-\log(\sigma^2)\right)$ |
| $\mathcal{L}_{\mathrm{a}}(\mu,\sigma)$ | $\mathcal{N}(0,1)$ | $\frac{1}{2}\mu^2+\sigma^2-1-\frac{1}{2}\log\left(\frac{2\sigma^2}{\pi}\right)$ |
| $\mathcal{L}_{\mathrm{o}}(\mu,\sigma)$ | $\mathcal{N}(0,1)$ | $\frac{1}{2}\mu^2+\frac{\pi^2}{6}\sigma^2-2-\frac{1}{2}\log\left(\frac{\sigma^2}{2\pi}\right)$ |
| $\mathcal{U}(\mu,\sigma)$ | $\mathcal{N}(0,1)$ | $\frac{1}{2}\mu^2+\frac{1}{6}\sigma^2-\frac{1}{2}\log\left(\frac{2\sigma^2}{\pi}\right)$ |
| $\mathcal{G}(\mu,\sigma)$ | $\mathcal{N}(0,1)$ | $\log\left(\frac{\sqrt{2\pi}}{\sigma}\right)+\frac{\pi^2\sigma^2}{12}+\frac{(\mu+\sigma\gamma_0)^2}{2}-\gamma_0-1$ |
| $\mathcal{E}(\sigma)$ | $\mathcal{N}(0,1)$ | $\sigma^2-1-\frac{1}{2}\log\left(\frac{\sigma^2}{2\pi}\right)$ |
| $\mathcal{N}(\mu,\sigma)$ | $\mathcal{L}_{\mathrm{a}}(0,1)$ | $\mu\cdot\mathrm{erf}\frac{\mu}{\sqrt{2\sigma^2}}+\sqrt{\frac{2\sigma^2}{\pi}}\exp\left(-\frac{\mu^2}{2\sigma^2}\right)$ $-\frac{1}{2}-\frac{1}{2}\log\left(\frac{\pi\sigma^2}{2}\right)$ |
| $\mathcal{L}_{\mathrm{a}}(\mu,\sigma)$ | $\mathcal{L}_{\mathrm{a}}(0,1)$ | $\|\mu\|+\sigma\exp\left(-\frac{\|\mu\|}{\sigma}\right)-1-\log(\sigma)$ |
| $\mathcal{L}_{\mathrm{o}}(\mu,\sigma)$ | $\mathcal{L}_{\mathrm{a}}(0,1)$ | $2\sigma\log\left(2\cosh\left(\frac{\mu}{2\sigma}\right)\right)-2-\log\left(\frac{\sigma}{2}\right)$ |
| $\mathcal{E}(\sigma)$ | $\mathcal{L}_{\mathrm{a}}(0,1)$ | $\sigma-\log(\sigma)-1+\log(2)$ |
| $\mathcal{C}(\mu,\sigma)$ | $\mathcal{C}(0,1)$ | $\log(\mu^2+(1+\sigma)^2)-\log(4\sigma)$ |
| $\mathcal{U}(\mu,\sigma)$ | $\mathcal{C}(0,1)$ | $\frac{1}{\sigma}\tan^{-1}(\sigma-\mu)+\frac{1}{\sigma}\tan^{-1}(\sigma+\mu)-2$ $-\log\left(\frac{2\sigma}{\pi}\right)+\frac{\sigma-\mu}{2\sigma}\log\left(1+(\sigma-\mu)^2\right)$ $+\frac{\sigma+\mu}{2\sigma}\log\left(1+(\sigma+\mu)^2\right)$ |
| $\mathcal{N}(\mu,\sigma)$ | $\mathcal{G}(0,1)$ | $-\log(\sigma)+\mu+\exp\left(-\mu+\frac{\sigma^2}{2}\right)-\frac{1+\log(2\pi)}{2}$ |
| $\mathcal{U}(\mu,\sigma)$ | $\mathcal{G}(0,1)$ | $\mu+\frac{1}{\sigma}\exp(-\mu)\sinh(\sigma)-\log(2\sigma)$ |
| $\mathcal{G}(\mu,\sigma)$ | $\mathcal{G}(0,1)$ | $\mu-\log(\sigma)+\Gamma(\sigma+1)\mathrm{e}^{-\mu}-1+\gamma_0(\sigma-1)$ |
| $\mathcal{E}(\sigma)$ | $\mathcal{G}(0,1)$ | $\sigma+(1+\sigma)^{-1}-1-\log(\sigma)$ |

FIG. 5B $$D_\alpha(Q\|\Pi) = \frac{1}{\alpha - 1} \log \mathop{\mathbb{E}}_{z \sim Q} \left[ \left( \frac{Q(z)}{\Pi(z)} \right)^{\alpha - 1} \right]$$

RÉNYI DIVERGENCE $D_\alpha(Q\|\Pi)$ SPECIAL CASES [10]

| Order $\alpha$ | Definition | Correspondence |
|---|---|---|
| $\alpha \to 0$ | $-\log \int_{Q(z)>0} \Pi(z)\mathrm{d}z$ | Overlap (i.e., IWAE [7]) |
| $\alpha = 0.5$ | $-2\log(1 - \mathrm{Hel}^2[Q\|\Pi])$ | Square Hellinger distance |
| $\alpha \to 1$ | $\int Q(z) \log \frac{Q(z)}{\Pi(z)} \mathrm{d}z$ | KLD (i.e., standard VAE [1]) |
| $\alpha = 2$ | $-\log(1 - \chi^2[Q\|\Pi])$ | $\chi^2$-divergence |
| $\alpha \to \infty$ | $\log \max \frac{Q(z)}{\Pi(z)}$ | Worst-case regret |

FIG. 6

GENERALIZED NLL FOR VARIOUS LIKELIHOOD BELIEFS $P$

| Likelihood $P$ | Generalized NLL Loss $\ell$ |
|---|---|
| $\mathcal{B}(\lambda)$ | $\mathsf{BCE}(x;\lambda) = -x\log(\lambda) - (1-x)\log(1-\lambda)$ |
| $\mathcal{CB}(\lambda)$ | $\mathsf{NLL}(x;\lambda) = \mathsf{BCE}(x;\lambda) - \log C(\lambda)$ |
| $\mathcal{N}(\lambda,*)$ | $\mathsf{MSE}(x;\lambda) = (x-\lambda)^2$ (omitting unspecified variance) |
| $\mathcal{L}_{\mathrm{a}}(\lambda,*)$ | $\mathsf{MAE}(x;\lambda) = \lvert x-\lambda\rvert$ (omitting unspecified variance) |
| $\mathcal{N}(\lambda,\gamma)$ | $\mathsf{NLL}(x;\lambda,\gamma) = \frac{1}{2\gamma^2}\mathsf{MSE}(x;\lambda) + \frac{1}{2}\log(2\pi\gamma^2)$ |
| $\mathcal{L}_{\mathrm{a}}(\lambda,\gamma)$ | $\mathsf{NLL}(x;\lambda,\gamma) = \frac{1}{\gamma}\mathsf{MAE}(x;\lambda) + \log(2\gamma)$ |
| $\mathcal{B}_{\mathrm{e}}(\lambda,\gamma)$ | $\mathsf{NLL}(x;\lambda,\gamma) = (1-\lambda)\log(x) + (1-\gamma)\log(1-x) + \log\Gamma(\lambda) + \log\Gamma(\gamma) - \log\Gamma(\lambda+\gamma)$ |

FIG. 7

| | $\mathcal{N} \| \mathcal{N}$ | $\mathcal{L}_a \| \mathcal{N}$ | $\mathcal{L}_o \| \mathcal{N}$ | $\mathcal{U} \| \mathcal{N}$ | $\mathcal{G} \| \mathcal{N}$ | $\mathcal{E} \| \mathcal{N}$ | $\mathcal{N} \| \mathcal{L}_a$ | $\mathcal{L}_a \| \mathcal{L}_a$ | $\mathcal{L}_o \| \mathcal{L}_a$ | $\mathcal{E} \| \mathcal{L}_a$ | $\mathcal{C} \| \mathcal{C}$ | $\mathcal{U} \| \mathcal{C}$ | $\mathcal{G} \| \mathcal{G}$ | Auto |
|---|---|---|---|---|---|---|---|---|---|---|---|---|---|---|
| (a) Likelihood Belief $P = \mathcal{N}(\lambda, *)$: Unspecified Normal Distribution, i.e., MSE Loss | | | | | | | | | | | | | | |
| $\hat{\mathcal{L}}_{1,1}$ | -19.74 | -20.35 | -19.23 | -22.47 | -20.60 | -39.76 | -19.74 | -19.42 | -19.39 | -34.06 | -26.56 | -26.33 | -19.49 | **-19.01** |
| MSE | 12.71 | 12.76 | **12.59** | 12.84 | 12.91 | 20.0 | 12.61 | 13.00 | 12.72 | 16.76 | 26.44 | 12.84 | 13.14 | 12.74 |
| FID | 119.0 | 119.4 | **113.2** | 142.6 | 139.2 | 126.0 | 119.4 | 126.9 | 120.7 | 223.5 | 348.4 | 147.2 | 134.7 | 126.1 |
| KID | 0.125 | 0.127 | **0.118** | 0.138 | 0.154 | 0.164 | 0.145 | 0.133 | 0.126 | 0.246 | 0.528 | 0.142 | 0.149 | 0.135 |
| (b) Likelihood Belief $P = \mathcal{B}(\lambda)$: Bernoulli Distribution, i.e., BCE Loss | | | | | | | | | | | | | | |
| $\hat{\mathcal{L}}_{1,1}$ | -102.5 | -103.9 | -102.9 | -105.9 | -103.5 | -163.6 | -102.7 | -103.9 | -103.2 | -148.1 | -203.4 | -108.6 | -103.4 | **-101.6** |
| BCE | 77.15 | 77.01 | 76.62 | 76.66 | 76.20 | 124.4 | 76.81 | 78.26 | 77.35 | 121.6 | 202.5 | 76.67 | 76.90 | **76.30** |
| FID | 42.91 | 43.50 | 44.01 | 42.76 | 41.82 | 113.27 | 40.80 | 41.59 | 42.13 | 152.6 | 389.3 | 42.42 | 40.88 | **40.19** |
| KID | 0.0369 | 0.0370 | 0.0378 | 0.0359 | 0.0349 | 0.1236 | 0.0347 | 0.0348 | 0.0360 | 0.1908 | 0.6302 | 0.0338 | 0.0344 | **0.0337** |

FIG. 8A

AUTOMATED VARIATIONAL INFERENCE USING STOCHASTIC MODELS WITH IRREGULAR BELIEFS

FIELD OF THE INVENTION

The present invention is related to an automated learning system of an artificial neural network, and more particularly to an automated Bayesian inference system based on stochastic neural networks with irregular beliefs.

BACKGROUND & PRIOR ART

The great advancement of deep learning techniques based on deep neural networks (DNN) has resolved various issues in data processing, including: media signal processing for video, speech, and images; physical data processing for radio wave, electrical pulse, and optical beams; and physiological data processing for heart rate, temperature, and blood pressure. However, DNN architecture is often handcrafted by insights from experts who know inherent data models and structures. How to optimize the architecture of DNN requires time/resource-consuming trial-and-error approaches. A framework of automated machine learning (AutoML) was used to automatically explore different DNN architectures to resolve the issue. The automation of hyperparameter and architecture exploration in the context of AutoML can facilitate the DNN design suited for particular data processing. The AutoML includes architecture search, learning rule design, and augmentation exploration. Most AutoML methods use either evolutionary optimization, hypergradient, or reinforcement learning framework to adjust hyperparameters or to construct network architecture from pre-selected choices of building blocks. A recent AutoMIL-Zero considers an extension to preclude experts' knowledge and insights for fully automated designs from scratch.

Learning data representations that capture task-related features, but are invariant to nuisance variations remains a key challenge in machine learning. A stochastic DNN called variational autoencoder (VAE) introduced variational Bayesian inference methods, incorporating autoassociative architectures, where generative and inference models are learned jointly by using a pair of a decoder architecture and an encoder architecture. This method was extended with a conditional VAE, which introduces a conditioning variable that could be used to represent nuisance, and a regularized VAE, which considers disentangling the nuisance variable from the latent representation. The concept of adversarial learning was considered in Generative Adversarial Networks (GAN), and has been adopted into a myriad of applications. The simultaneously discovered Adversarially Learned Inference (ALI) and Bidirectional GAN (BiGAN) proposed an adversarial approach toward training an autoencoder. Adversarial training has also been combined with VAE to regularize and disentangle the latent representations so that nuisance-robust learning is realized.

For Bayesian inference, the VAE is configured with a parametric encoder and decoder to learn latent variables underlying the data within a variational inference (VI) framework. There are many variants of such stochastic DNNs. For example, f-VAE uses an emphasized Kullback-Leibler divergence (KLD) to regularize the latent distribution more strongly than typical evidence-lower bound (ELBO)-based loss. The continuous Bernoulli and beta distributions are studied as alternative likelihood beliefs for data reconstruction model. Laplace and Cauchy distributions are considered as an alternative prior belief for sparse latent representations. The normal posterior belief is adjusted by inverse autoregressive flow (IAF), importance-weighted autoencoder (IWAE), and Gibbs sampling. The IWAE is further extended to the variational Renyi (VR) based on the Renyi's $\alpha$-divergence. The generalized VI (GVI) then discusses any arbitrary loss, divergence, and posterior selections. And, it shows higher robustness with different discrepancy measures instead of KLD when the data statistics are not specified.

While the generalized VAE offers great degrees of freedom, it in turn makes difficult to design those selections in addition to other architecture hyperparameters. There is no framework to design variational Bayesian inference and stochastic DNNs when inherent model is unspecified to capture data statistics and probabilistic uncertainty. For example, stochastic DNNs including VAEs, variational information bottleneck (VIB), and denoising diffusion probabilisitc model (DDPM) typically use homogeneous statistics for latent representations based on the normal distribution. The normal distribution is computationally convenient because simple sampling, reparameterization trick and closed-form expression of divergence are possible for gradient calculations. However, when no statistics underlying the real datasets are known in advance, the normal distribution is no longer optimal in general.

However, AutoML has a drawback that it requires a lot of exploration time to find the best hyperparameters due to the search space explosion. In addition, without any good reasoning, most search space of link connectivity will be pointless. In order to develop a system for an automated construction of an artificial neural network with justifiability, a method called AutoBayes was proposed. The AutoBayes method explores different Bayesian graph to represent inherent graphical relation among random variables for generative models, and subsequently construct the most reasonable inference graph to connect an encoder, decoder, classifier, regressor, adversary, and estimator. With the use of so-called Bayes ball algorithm, the most compact inference graph for a particular Bayesian graph can be automatically constructed, and some factors are identified as a variable independence of a domain factor to be censored by an adversarial block. The adversarial censoring to disentangle nuicasnse factors from feature spaces was verified effective for domain generalization in pre-shot transfer learning and domain adaptation in post-shot transfer learning. However, adversarial training requires careful choice of hyperparameters because too strong censoring will hurt the main task performance because the main objective function is relatively under-weighted. Moreover, the adversarial censoring is not only sole regularization approach to promote independence from nuicanse variables in feature space.

Accordingly, there is a need to efficiently identify the best probabilistic model for stochastic DNNs dependent on particular problem and dataset.

SUMMARY OF THE INVENTION

The present invention is based on a recognition that a stochastic deep neural network (DNN) uses a specific probabilistic model and that there are many different probabilistic models including normal, Laplace, Cauchy, logistic, Gumbel, student-t, uniform, exponential, and hyper-exponential distributions to impose while the true probabilistic model underlying real-world dataset is unknown in general. In addition, there are unlimited possibilities to represent latent variables and data stochastics as well as relevance measures such as divergence metric in the generalized variational inference (GVI). For example, there is no formal framework to determine what discrepancy measure to be chosen from the unlimited possibilities including Kullback-Leibler divergence (KLD), Renyi's alpha divergence, beta divergence, gamma divergence, Jensen-Shannon divergence, Jeffery divergence, and Fisher divergence to regularize stochastic nodes in DNNs. Furthermore, data uncertainty to identify the likelihood belief is also not specified in general. For example, normal distribution is typically used to minimize weighted mean-square error (MSE) for regression issues, and Bernoulli distribution is often used to minimize binary cross-entropy as a reconstruction loss for near binary pixel images.

The present invention enables stochastic DNNs to efficiently identify data statistics and uncertainty models through the use of AutoML framework for better combinations of prior, posterior, and likelihood beliefs as well as discrepancy measures. This provides a benefit beyond automated construction of DNN architectures such as layer size, node size, activation type, and link connectivity of DNNs. Specifically, the invention provides a way to search for irregular combinations of stochastic models on top of the conventional architecture hyperparameters. Some embodiments allow stochastic DNNs to impose mismatched pairs of posterior and prior beliefs to increase the degrees of freedom for modeling capacity under unspecified model uncertainty. Yet another embodiment provides a way to generalize stochastic DNNs towards heterogenous pairs of posterior and prior beliefs at different hidden nodes and hidden layers. In such a manner, more robust and complicated latent representations can be realized. In addition, the present invention provides a way to automatically search for irregular, mismatched, and heterogenous assignments of discrepancy measures for individual stochastic nodes. For example, the first latent node uses logistic distribution as a posterior belief and normal distribution as a prior belief using a discrepancy measure of KLD, while the second latent node uses Cauchy distribution as a posterior belief and uniform distribution as a prior belief using Renyi's alpha divergence of order 0.4. Such a mixed heterogenous stochastic model can improve the generalizability across different datasets which follow unknown uncertainty. Some embodiments use a categorical search space across different beliefs using a variant of reparameterization trick such as the Gumbel softmax trick for latent representations in VAEs, VIBs, DDPMs, and its variants in conjunction with the network architecture search. The prior, posterior, and likelihood beliefs include but not limited to the normal distribution, Cauchy distribution, logistic distribution, Laplace distribution, uniform distribution, triangle distribution, Gumbel distribution, exponential distribution, generalized Gaussian distribution, Beta distribution, Gamma distribution, Poisson distribution, Bernoulli distribution, and so on. In addition, different censoring methods such as adversarial disentanglement can promote latent representations within stochastic DNN models to be independent of nuisance parameters, so that nuisance-robust feature extraction is realized for some embodiments.

The invention provides a way to adjust those hyperparameters and irregular beliefs under AutoMIL framework based on a hypergradient method such as Bayesian optimization, implicit gradient, reinforcement learning, and heuristic optimization. Yet another embodiments use mismatched posterior-prior pairing and heterogenous distributions in stochastic DNNs. For example, the posterior belief for the VAE encoder uses the logistic distribution while the prior belief for the VAE decoder uses the normal distribution for the stochastic latent variables. The invention is based on a recognition that smaller divergence is not always better due to a model mismatch, suggesting that the heterogeneous posterior-prior pairing has a potential to provide better Bayesian model for the whole stochastic DNNs especially when no uncertainty model is specified in advance.

Another embodiment uses multiple intermediate representations for variational sampling to improve the model accuracy. For this case, the number of combinations to choose for each latent layers will grow rapidly and thus automated search will be of importance. In addition, the present invention provides a way to allow irregular non-uniform posterior-prior pairing at every latent variables for some embodiments. One embodiment realizes the ensemble methods exploring stacking protocols over cross validation during AutoMVL. The invention provides a way to automatically generate an auxiliary model which directly controls the parameters of the base inference model by analyzing consistent evolution behaviors in the main DNN models. For some embodiments, the types of divergence are also automatically chosen in inhomogeneous and irregular manner. For example, Renyi's alpha divergence, beta divergence, gamma divergence, Wasserstein distance, and its order are jointly explored to be robust against numerically intractable data statistics occurred in real world.

The present disclosure relates to systems and methods for an automated construction of a stochastic DNN through an exploration of different uncertainty models and hyperparameters. Specifically, the system of the present invention introduces an automated variational Bayesian inference framework that explores different posterior/prior/likelihood/discrepancy sets for a variational inference model linking classifier, encoder, decoder, and estimator blocks to optimize nuisance-invariant machine learning pipelines. In one embodiment, the framework is applied to a series of physiological datasets, where we have access to subject and class labels during training, and provide analysis of its capability for subject transfer learning with/without variational modeling and adversarial training. The framework can be effectively utilized in semi-supervised multi-class classification, multi-dimensional regression, and data reconstruction tasks for various dataset forms such as media signals and electrical signals as well as biosignals.

Some embodiments of the present disclosure are based on a recognition that a new concept called AutoBayes, which explores various different Bayesian graph models to facilitate searching for the best inference strategy, is suited for nuisance-robust inference systems. With the Bayes-Ball algorithm, the method and system in the present invention can automatically construct reasonable link connections among classifier, encoder, decoder, nuisance estimator and adversary DNN blocks as well as different belief combinations for stochastic nodes. From no free-lunch theorem the use of one particular model without exploring its variants can potentially suffer a poor inference result. In addition, the best model at one dataset does not always perform best for different data, that encourages the use of AutoML framework for adaptive model generation given target datasets. One embodiment extends the AutoBayes framework to integrate stochastic DNNs for unspecified/misspecified uncertainty underlying datasets by exploring different set of irregular beliefs for posterior, prior, likelihood, and discrepancy.

Another embodiment uses variational sampling for semi-supervised setting for the case when the datasets include missing target labels. Yet another embodiment uses an ensemble stacking which combines estimates of multiple different Bayesian models to improve the performance. Another embodiment uses stochastic graph neural networks to exploit geometry information of the data, and pruning strategy is assisted by the belief propagation across Bayesian graphs to validate the relevance. Wasserstein distance can be also used instead of divergence. For some embodiments, the system and method can be combined with existing test-time online adaptation techniques from the zero-shot and few-shot learning frameworks to achieve even better nuisance-robust performance. The system can offer a benefit to learn nuisance-invariant representations by exploring a variety of regularization modules and uncertainty models. Yet another embodiment uses quantum and molecular devices for sampling stochastic nodes by exploiting the device randomness. Some embodiments use invertible network architecture to model encoder and decoder at the same time without having two disjoint models. Some embodiments use stochastic implicit layers such as neural ordinary differential equation, convex optimization, deep equilibrium, diffusion model, and quantum dynamics, embedded in the DNN architecture. In such a manner, the invention provides a way to design Bayesian machine learning models so that unknown uncertainty underlaying datasets are automatically modeled with a robustness by exploring various combinations of prior, posterior, and likelihood beliefs in stochastic representation learning such as VAE, DDPM, and VIB under an imperfect and misspecified knowledge of data statistics.

Further, according to some embodiments of the present invention, a system for data analysis using a stochastic DNN block is provided. In this case, the system for signal analysis includes an interface, the stochastic deep neural network (DNN) block, a memory bank, and a processor. The interface is configured to receive and send signals such as datasets which are multi-dimensional signals associated with task labels. The stochastic DNN block is used to identify the task labels from the multi-dimensional signals through stochastic nodes, which are individually specified by irregular beliefs for posterior, prior, and likelihood distributions as well as discrepancy measures. The memory bank is used to store the datasets, the irregular beliefs, other hyperparameters, and trainable parameters to determine the stochastic DNN block. The processor, in connection with the interface and the memory bank, executes a probabilistic inference to analyze the datasets by using the stochastic DNN block. The probabilistic inference is realized by an importance-weighted accumulation after a variational sampling at stochastic nodes according to the irregular beliefs. The stochastic DNN block includes a variant of VAE, VIB, and DDPM, configured with a combination of transform layers, interconnections, nonlinear activations, and regularization layers. The variational sampling uses a random number generator based on a reparameterization trick according to variational parameters including location, scale, shapes, and temperature specified by the irregular beliefs. The discrepancy measures include a combination of Renyi's alpha divergence, beta divergence, gamma divergence, Fisher divergence, and Jeffrey divergence.

The irregular beliefs include a mismatched or heterogeneous combination of discrete univariate distributions, normal-related distributions, exponential-related distributions, extreme-value distributions, bounded distributions, heavy-tail distributions, quantile-based distributions, systematic distributions, multivariate continuous distributions, and multivariate discrete distributions. The stochastic DNN block uses a heterogenous allocation of different beliefs for at least two disjoint set of stochastic nodes in the same layer. Further, the stochastic DNN block uses a mismatched pair of posterior belief and prior belief for at least one set of stochastic nodes. At least two different types of uncertainty models for posterior, prior, and likelihood beliefs are simultaneously imposed in disjoint stochastic nodes. Further, different discrepancy measures such as KLD and Renyi's alpha divergence are imposed simultaneously in the stochastic DNN block to regularize the stochastic nodes. The irregular beliefs are also adjustable on the fly to use different probabilistic distributions for the variational sampling at the stochastic nodes when analyzing newly available set of datasets.

The system of some embodiments employs steps of: exploring different values for the irregular beliefs and the hyperparameters by using a hypergradient method; configuring the stochastic DNN by modifying the connectivity among the multi-dimensional signals, the task labels, and the stochastic nodes; calculating a loss function by forward-propagating the datasets across the stochastic DNN block according to the probabilistic inference; modifying the loss function by regularizing the stochastic nodes according to the discrepancy measures; backward-propagating a gradient of the loss function with respect to the trainable parameters; and updating the trainable parameters with a gradient method.

By allowing irregular beliefs at the stochastic DNN block, more complicated model description for unknown statistics of real-world datasets can be realized. Therefore, the system of the present invention offers better variational inference result even when the real-world datasets are not intractable in any close-form statistical model by exploring irregular combinations of posterior, prior, and likelihood distributions in the stochastic DNN block.

Yet further, some embodiments of the present invention provide a computer-implemented method for variational inference using a stochastic DNN. Specifically, the method of variational inference includes feeding data signals into the stochastic DNN, propagating the signals according to layers in the stochastic DNN, by employing a variational sampling at the stochastic nodes according to irregular beliefs, and accumulating the output of the stochastic DNN as a probabilistic inference result. In addition, the method for automated design of variational inference model includes calculating a loss function based on a variational bound to regularize the stochastic nodes according to discrepancy measures, back-propagating a gradient of the loss function with respect to trainable parameters, updating the trainable parameters according to a gradient method, and exploring different values for the irregular beliefs according to a hypergradient method. The gradient method employs a combination of stochastic gradient descent, adaptive momentum, Ada gradient, Ada bound, Nesterov accelerated gradient, root-mean-square propagation, and its variant. The hypergradient method employs a combination of reinforcement learning, implicit gradient, evolutionary strategy, differential evolution, particle swarm, genetic algorithm, simulated annealing, Bayesian optimization, and its variant.

BRIEF DESCRIPTION OF THE DRAWING

The accompanying drawings, which are included to provide a further understanding of the invention, illustrate embodiments of the invention and together with the description, explaining the principle of the invention.

FIG. 3 shows exemplar variants of irregular beliefs, according to some embodiments;

FIG. 4A shows exemplar beliefs for posterior, prior, and likelihood distributions used for stochastic DNN, according to some embodiments;

FIG. 5B shows exemplar pairs of posterior belief and prior belief quantified by KLD discrepancy measure, according to some embodiments;

FIG. 6 shows exemplar discrepancy measures based on Renyi's $\alpha$-divergence, which covers variants of generalized variational inference including importance-weighted autoencoder (IWAE) and standard VAE, according to some embodiments;

FIG. 7 shows exemplar likelihood beliefs P for stochastic DNNs to determine generalized negative-log likelihood loss, according to some embodiments;

FIG. 8A shows exemplar characteristics for various combinations of posterior belief, prior belief, likelihood belief, and discrepancy measures for generalized VAE model, according to some embodiments;

DETAILED DESCRIPTION OF THE PREFERRED EMBODIMENTS

Figures 1A, 1B, 1C:
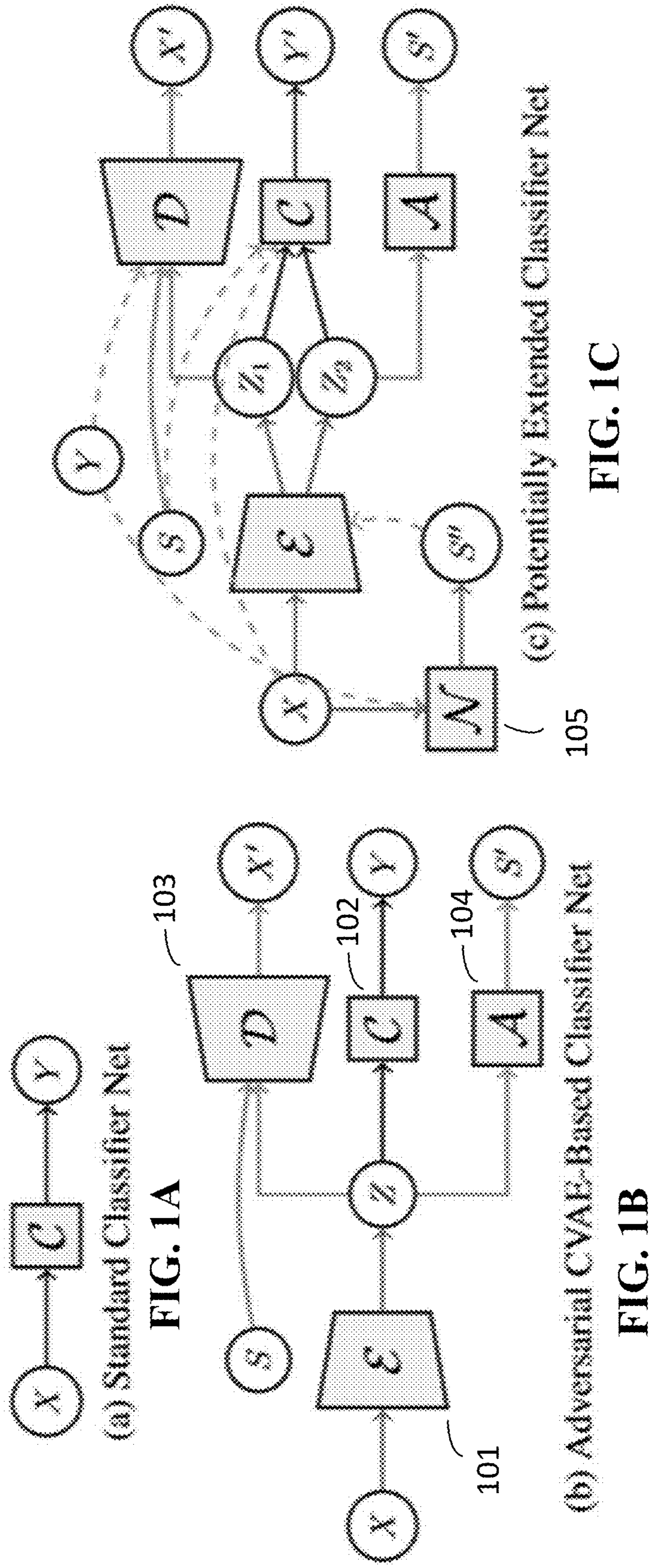
FIG. 1A shows an exemplar inference model to predict Y given data X, according to some embodiments.
FIG. 1B and FIG. 1C show exemplar inference models to predict Y given data X under latent variables Z and nuisance factor S, according to some embodiments.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

The present invention provides a system and method to analyze signals in datasets based on generalized variational inference (GVI) framework using probabilistic models underlying the datasets as an artificial intelligence (AI) pipeline. FIG. 1A shows an exemplar inference model to predict a task label Y given a data X, according to some embodiments. The task label is either categorical identity numbers or non-categorical continuous values. For categorical inference, the AI model performs a classification task, while the AI model performs a regression task for non-categorical inference. For some embodiments, the task label is a mixture of multiple categorical and continuous labels as a multi-task inference. The task label is either a scalar value or a vector of multiple values for supervised learning. For unsupervised learning, the task label is not provided explicitly, or the task label is equivalent to the input data for reconstruction for some embodiments. The data in datasets are tensor formats having at least one axis to represent numerous signals and sensor measurements, including but not limited to:

- media data, such as images, pictures, movies, texts, letters, voices, music, audios, and speech;
- physical data, such as radio waves, optical signals, electrical pulses, temperatures, pressures, accelerations, speeds, vibrations, and forces; and
- physiological data, such as heart rate, blood pressure, mass, moisture, electroencephalogram, electromyogram, electrocardiogram, mechanomyogram, electrooculogram, galvanic skin response, magnetoencephalogram, and electrocorticography.

For example, the AI model predicts an emotion from brainwave measurement of a person, where the data is a three-axis tensor representing a spatio-temporal spectrogram from multiple-channel sensors over a certain measurement time. All available data signals with a pair of X and Y are bundled as a whole batch of dataset for training the AI model, and they are called training data or training dataset. For some embodiments, the task label Y is missing for a fraction of the training dataset in semi-supervised learning, where the missing labels are predicted by the AI model for self supervising.

The AI model can be realized by a deep neural network (DNN) model, whose architecture and behavior are specified by a set of hyperparameters. The set of hyperparameters include but not limited to:

- training hyperparameters determining a scheduling policy such as learning rates, weight decays, gradient momentum, divergence orders, batch sizes, a number of epochs, early stopping, dropout rates, and regularization weights;
- architecture hyperparameters such as a connectivity, a type of layer operations, a type of activation functions, a size of trainable parameters, a choice of stochastic nodes, a number of layer depth, and a set of layer widths to determine the DNN architecture; and
- deployment hyperparameters such as an initialization and quantization policy for the trainable parameters.

The DNN model is typically based on a multi-layer perceptron using combinations of cells including but not limited to:

- transform layers such as fully-connected layer, bilinear layer, convolutional layer, graph convolutional layer, recurrent layer, implicit layer, attention layer, pooling layer, padding layer, inception layer, and transformer layer;
- interconnections such as loopy connection, skip addition, skip multiplication, and skip concatenation;
- nonlinear activations such as rectified linear variants, sigmoid variants, shrinkage variants, softmax variants, gated liner, soft plus, and soft sign; and
- regularization layers such as dropout, swap out, zone out, block out, drop connect, shaking, shaffle, batch normalization, layer normalization, local response normalization, group normalization, and instance normalization.

For example, a residual network architecture uses skip addition from a hidden layer to another hidden layer, that enables stable learning of deeper layers. The DNN model has a number of trainable parameters such as affine-transform weights and biases.

The DNN model is trained for the training dataset to minimize or maximize an objective function (also called as a loss function or utility function) by a gradient method, including but not limited to stochastic gradient descent, adaptive momentum gradient, root-mean-square propation, ada gradient, ada delta, ada max, ada bound, Nesterov accelerated gradient, resilient backpropagation, and weighted adaptive momentum. For some embodiments, the training dataset is split into multiple sub-batches for local gradient updating. For some embodiments, a fraction of the training dataset is held out for validation dataset to evaluate the performance of the DNN model. The validation dataset from the training dataset is circulated for cross validation in some embodiments. The way to split the training data into sub-batches for cross validations includes but not limited to: random sampling; weighted random sampling; one session held out; one subject held out; one region held out. Typically, the data distribution for each sub-batches is non identical due to a domain shift.

The gradient-based optimization algorithms have some hyperparameters such as learning rate and weight decay. The learning rate is an important parameter to choose, and can be automatically adjusted by some scheduling policies such as a step function, exponential function, trigonometric function, and adaptive decay on plateou. Other optimization methods such as evolutionary strategy, genetic algorithm, differential evolution, simulated annealing, particle swarm, Bayesian optimization, and Nelder-Mead can be also used to optimize the trainable parameters. The objective function is a combination of various functions including but not limited to: L1 loss; Lp norm; mean-square error; cross entropy; connectionist temporal classification loss; negative log likelihood; Kullback-Leibler divergence (KLD); cross covariance; structural similarity; cosine similarity; clustering loss; margin ranking loss; hinge loss; Huber loss; negative sampling; Wasserstein distance; triplet loss.

The AI model having no guidance for hidden nodes often suffers from a local minimum trapping due to the over-parameterized DNN architecture to solve a task problem. In order to stabilize the training convergence, some regularization techniques are used. For example, L1/L2 -norm is used to regularize the affine-transform weights. Batch normalization and dropout techniques are also widely used to prevent over-fitting. Other regularization techniques include but not limited to: drop connect; drop block; drop path; shake drop; spatial drop; zone out; stochastic depth; stochastic width; spectral normalization; shake-shake. However, those well-known regularization techniques do not exploit underlaying data statistics. Most datasets have a particular probabilistic relation between X and Y as well as potential nuisance factors S disturbing the task prediction performance. For example, physiological dataset such as brainwave signals highly depend on subject's mental states and measurement conditions, those of which are treated as nuisance factors S. The nuisance variations include but not limited to a set of subject identities, session numbers, biological states, environmental states, sensor states, sensor locations, sensor orientations, sampling rates, time and sensitivities. For yet another example, electro-magnetic dataset such as Wi-Fi signals are susceptive to room environment, ambient users, interference and hardware imperfections. The present disclosure provides a way to efficiently regularize the DNN blocks by considering those nuisance factors so that the AI model is insensitive to a domain shift caused by the change of nuisance factors.

The present disclosure is based on a stochastic DNN which imposes a probabilistic model at intermediate layers and latent variables, the nodes of which are called stochastic nodes. Specifically, stochastic intermediate layers are randomly sampled from a particular distribution family such as normal distribution, whose variational parameters such as location factor (or mean) and scale factor (or standard deviation) are defined by intermediate layers of the stochastic DNN. To enable the variational parameters differentiable, the reparameterization trick is used where a random variable sampled from the standard distribution is shifted and scaled to be distributed with a desired distribution of latent variables. To regularize the stochastic nodes, some embodiments modifies a loss function based on discrepancy measure, including but not limited to: KLD; Renyi's alpha-divergence; beta-divergence; gamma-divergence; Jeffery divergence; Fisher divergence; Jensen-Shannon divergence; Wassestern distance.

In GVI framework, the target distribution is specified as a prior belief and the sample distribution is specified as a posterior belief. In addition, the task label and the data predictions are also stochastically defined under a particular uncertainty model, determining a likelihood belief. The likelihood belief includes but not limited to: normal distribution; Bernoulli distribution; unspecified normal distribution; continuous Bernoulli distribution; Laplace distribution; Cauchy distribution; Beta distribution; unspecified Laplace distribution; Gamma distribution. Given specified likelihood belief, the corresponding negative log-likelihood (NLL) is used to minimize the objective function for the stochastic DNNs. For example, a variational autoencoder (VAE) uses an encoder model and decoder model to infer latent variables and generative model, respectively. For standard VAE, reconstruction loss based on mean-square error (MSE) is used under the hypothesis of likelihood belief based on unspecified normal distribution whose variance is not defined. In addition, the latent variables are typically sampled from normal distribution for both posterior and prior beliefs. Some embodiments of the invention allows irregular heterogenous pairing of posterior belief and prior belief to give additional degrees of freedom for unknown data uncertainty model. Yet another embodiment uses irregular heterogenous discrepancy measures at individual stochastic nodes in DNN models to be robust against misspecified uncertainty. Besides VAE, the stochastic DNN model includes but not limited to variational information bottleneck (VIB), denoising diffusion probabilistic model (DDPM), and variational Bayesian neural network for some embodiments.

The present invention uses irregular beliefs for posterior, prior, and likelihood distributions as well as its discrepancy measure to determine the statistics of the stochastic nodes in the stochastic DNN block. The irregular beliefs include a mismatched or heterogeneous combination of diverse distributions including but not limited to:

- discrete univariate distributions, such as Bernoulli, binomial, geometric, Pascal, hypergeometric, Waring Yule, Poisson, Skellam, discrete uniform, Zipf, log series, Benford, Polya, Tanner, and Poisson Consul distributions;
- normal-related distributions, such as normal, log normal, Johnson, half normal, skew normal, Voigt, Tsallis, hyperbolic, variance gamma, Student-t, chi, Rayleigh, Maxwell, chi-square, F-ratio, Fisher, Hotelling, and Tracy distributions;
- exponential-related distributions, such as exponential, Laplace, Lindley, logistic, sech, exponential power, shifted Gompertz, Erlang, hypoexponential, Coxian, gamma, Nakagami, Moyal, and Meixner distributions;
- extreme-value distributions, such as max stable, min stable, Gumbel, Frechet, and Weibull distributions;
- bounded distributions, such as uniform, arc-sine, Bates, Kumaraswamy, power, triangular, uniform sum, Mises, Wigner, and Pastur distributions;
- heavy-tail distributions, such as Pareto, Beta prime, Dagum, Davis, Singh Maddala, Cauchy, Landau, Levy, Benini, Gibrat, and Suzuki distributions;
- quantile-based distributions, such as Tukey, Wakeby distributions;
- systematic distributions, such as Pearson distribution;
- multivariate continuous distributions, such as multivariate normal, multinomial, multivariate-t, Dirichlet, and Copula distributions; and
- multivariate discrete distributions, such as multivariate hypergeometric, negative multinomial, and multivariate Poisson distributions.

For example, the stochastic DNN block uses a heterogenous allocation of different beliefs for at least two disjoint sets of stochastic nodes within one layer; e.g., the first 70% stochastic nodes at the second layer follow the logistic distributions and the remaining 30% stochastic nodes at the same layer follow the Cauchy distributions. For another example, the stochastic DNN block uses a mismatched pair of posterior belief and prior belief for at least one set of stochastic nodes; e.g., the stochastic nodes at the third layer uses the uniform distribution for the posterior belief while the same stochastic nodes uses the Laplace distribution for the prior belief. In addition, for some embodiments, the choice of irregular beliefs is adaptively modified on the fly to use different probabilistic distributions for the variational sampling at the stochastic nodes in the stochastic DNN block when analyzing newly available set of datasets despite the same stochastic DNN block was previously trained with the different irregular beliefs. For example, the stochastic nodes are trained to follow the normal distribution for training datasets, while the same stochastic nodes use the logistic distribution for testing datasets. This allows further adaptation to reduce a model mismatch in unseen testing datasets.

The stochastic DNN block provides a probabilistic inference to analyze the datasets by using an importance-weighted accumulation after a variational sampling at stochastic nodes according to the irregular beliefs. The variational sampling uses a random number generator based on a reparameterization trick according to variational parameters such as location, scale, shapes, and temperature specified by the irregular beliefs. To optimize the stochastic DNN block, some embodiments perform steps of:

- exploring different values for the irregular beliefs and the hyperparameters by using a hypergradient method;
- configuring the stochastic DNN block by modifying the connectivity among the multi-dimensional signals, the task labels, and the stochastic nodes according to the hyperparameters;
- calculating a loss function by forward-propagating the datasets across the stochastic DNN block according to the probabilistic inference;
- modifying the loss function by regularizing the stochastic nodes according to the discrepancy measures;
- backward-propagating a gradient of the loss function with respect to the trainable parameters; and
- updating the trainable parameters with a gradient method.

The steps mainly include two methods for inference and optimization. The inference method for the stochastic DNN model employs feeding data signals into the DNN having a number of layers and stochastic nodes, propagating the signals according to the layers while the stochastic nodes uses a variational sampling according to the irregular beliefs, and accumulating the output of the DNN as a probabilistic inference result. On top of the inference method, the optimization method further employs calculating a loss function based on a variational bound to regularize the stochastic nodes according to the discrepancy measures, back-propagating a gradient of the loss function with respect to trainable parameters, updating the trainable parameters with a gradient method, and exploring different values for the irregular beliefs and hyperparameters with a hypergradient method. The hypergradient method enables efficient configuration of high-performance stochastic DNN models over conventional variational inference models which relies on regular beliefs having homogeneous and matched allocations for stochastic nodes.

Auxiliary Regularization Modules

FIG. 1B and FIG. 1C show exemplar inference models to predict Y given data X under latent variables Z and nuisance factor S, according to some embodiments. The DNN model uses a main pipeline, decomposed into an encoder part 101 and a classifier part 102 (or a regressor part for regression tasks), where the encoder part 101 extracts a feature vector as a latent variable Z from the data X, and the classifier part 102 predicts the task label Y from the latent variable Z. For example, the latent variable Z is a vector of hidden nodes at a middle layer of the DNN model. To stabilize the training convergence of the DNN model, some embodiments use regularization techniques against the latent variables Z. Besides the main pipeline of the encoder 101 and the classifier 102, FIG. 1B uses additional auxiliary regularization modules to regularize the latent variables Z. Specifically, a decoder DNN block 103 is attached with the latent variable Z to reconstruct the original data X with an optionally conditional information of the nuisance variations S. This conditional decoder 103 can promote a disentanglement of the nuisance domain information S from the latent variable Z. For example, the nuisance domain variations S include a subject identification (ID), a measurement session ID, noise level, subject's height/weight/age information and so on for physiological datasets. By disentangling those nuisance factors S from the latent variables Z, the present invention can realize a subject-invariant universal human-machine interface without long calibration sessions for some embodiments. The auxiliary DNN block called the decoder 103 is trained to minimize another loss term such as mean-square error and Gaussian negative log-likelihood loss to reproduce X from Z.

For some embodiments, the latent variations are further decomposed to multiple latent factors such as $Z_1, Z_2, \ldots, Z_L$, each of which is individually regularized by a set of nuisance factors $S_1, S_2, \ldots, S_N$. In addition, some nuisance factors are partly known or unknown depending on the datasets. For known labels of nuisance factors, the DNN blocks can be trained in a supervised manner, while it requires a semi-supervised manner for un-labeled nuisance factors. For semi-supervised cases, pseudo labeling based on variational sampling over all potential labels of nuisance factors is used for some embodiments, e.g., based on the reparameterization trick such as Gumbel softmax trick which uses a variational temperature parameter to control the sharpness of near-one-hot sample for categorical nuisance factors. For continuous nuisance factors, the variational sampling is based on the reparameterization trick using variational parameters including location, scale, and shapes to determine the probability distribution. For example, a fraction of data in datasets is missing a subject age information, whereas the rest of data has the age information to be used for supervised regularization.

The DNN blocks in FIG. 1B have another auxiliary regularization module 104 attached to the latent variable Z for estimating the nuisance variations S. This regularization DNN block 104 is used to further promote disentangling of nuisance factors to be robust, and often called an adversarial network as the regularization DNN block is trained to minimize a loss function to estimate S from Z to censor the nuisance information while the main pipeline DNN blocks is trained to maximize the loss function. The adversarial blocks are trained in alternating fashion with associated hyperparameters including an adversarial coefficient, an adversarial learning rate, an interval of adversarial alternation, and an architecture specification.

The graphical model in FIG. 1B is known as an adversarial conditional variational autoencoder (A-CVAE) for unsupervised feature extraction in connection with the downstream task classifier 102. The graphical model of A-CVAE has various graph nodes and graph edges to represent the connectivity cover random variable factors X, Y, Z, and S. With the regularization blocks, the A-CVAE model has a higher robustness against the nuisance factors. Accordingly, the auxiliary regularization modules are used as the so-called pre-shot transfer learning or domain generalization techniques to make the AI models robust against unseen nuisance factors.

The current invention provides a way to efficiently assign multiple different beliefs to individual stochastic nodes Z1, Z2, . . . , Zn. If there are 10 different posterior-prior pairs for 100 stochastic nodes, there exist at most $10^{100}$ potential combinations to specify the stochastic DNN. Some embodiments use automated machine learning (AutoMiL) framework based on a hypergradient method to facilitate finding better combinations of such a heterogenous pairing of posterior/prior beliefs. In addition, some embodiments allows different discrepancy measures for individual stochastic nodes. For example, Renyi's alpha-divergence of order 0.1 is used for Z1, Z2 uses alpha order of 0.2, and KLD is used for Z3. The search space grows rapidly while the invention allows such irregular stochastic models through the use of AutoML exploration. The hypergradient method for the AutoMiL is based on a combination of reinforcement learning, implicit gradient, evolutionary strategy, differential evolution, particle swarm, genetic algorithm, simulated annealing, and Bayesian optimization, to efficiently search for better combinations of irregular beliefs for the posterior, prior, and likelihood distributions as well as discrepancy measures simultaneously for individual stochastic nodes.

Architecture Exploration

There are numerous possible ways to connect the encoder 101, classifier 102, decoder 103, and adversarial network blocks 104. For example, FIG. 1C shows one exemplar DNN blocks where there is another auxiliary module 105 to estimate the nuisance factors S from the data X. As the possible number of realizable DNN connectivities explodes quickly with the size of the AI model, there is a need to efficiently construct reasonable AI model. In addition, randomly connected DNN blocks tend to be useless and unjustifiable. For some embodiments, the graph connectivity is explored by using an automated Bayesian graph exploration method called AutoBayes. At the core of AutoBayes is the consideration of graphical Bayesian models that capture the probabilistic relationship between random variables representing the data features X, task labels Y, nuisance variation labels S, and latent representations Z. The main goal is to infer the task label Y from the measured data feature X, which is hindered by the presence of nuisance variations (e.g., inter-subject/session variations) that are partially labelled by S. The latent representations Z (and further denoted by $Z_1, Z_2, \ldots, Z_L$ as needed) are also optionally introduced into the AI models to help capture the underlying relationship between S, X, and Y.

We let p(y, s, z, x) denote the joint probability distribution underlying the datasets for the four factors of random variables, Y, S, Z, and X. A chain rule of the probability calculous can yield the following factorization for a generative model from Y to X:

$$p(y,s,z,x)=p(y)p(s|y)p(z|s,y)p(x|z,s,y)$$

which is a full-chain Bayesian graph. The probability conditioned on X can be factorized, e.g., as follows:

$$p(y, s, z \mid x) = \begin{cases} p(z \mid x)p(s \mid z, x)p(y \mid s, z, x) \\ p(s \mid x)p(z \mid s, x)p(y \mid z, s, x) \end{cases}$$

which are marginalized to obtain the likelihood of task class Y given data X. The number of possible Bayesian graphs and inference graphs will increase rapidly when considering more nodes with multiple nuisance and latent variables.

The above graphical models do not impose any assumption of potentially inherent independency in datasets and thus most generic. However, depending on underlying independency in datasets, we can prune some edges in those graphs. For example, if the data has Markov chain of Y-X independent of S and Z, it automatically results into the AI model illustrated in FIG. 1A. This implies that the most complicated inference model having high degrees of freedom does not always perform best across arbitrary datasets. It entourages to consider an extended AutoML framework which automatically explores best pair of inference factor graph and corresponding Bayesian graph models matching datasets in addition to the other hyperparameters.

The AutoBayes begins with exploring any potential Bayesian graphs by cutting links of the full-chain graph, imposing possible independence. We then adopt the Bayes-Ball algorithm on each hypothetical Bayesian graph to examine conditional independence over different inference strategies. The Bayes-Ball algorithm justifies the reasonable pruning of the links in the full-chain inference graphs, and also the potential adversary censoring when Z is independent of S. This process automatically constructs a connectivity of inference, generative, and adversary blocks with good reasoning, e.g., to construct A-CVAE classifier in FIG. 1B rather than an arbitrary extended model in FIG. 1C.

Exemplar Stochastic DNN Models

Figure 2:
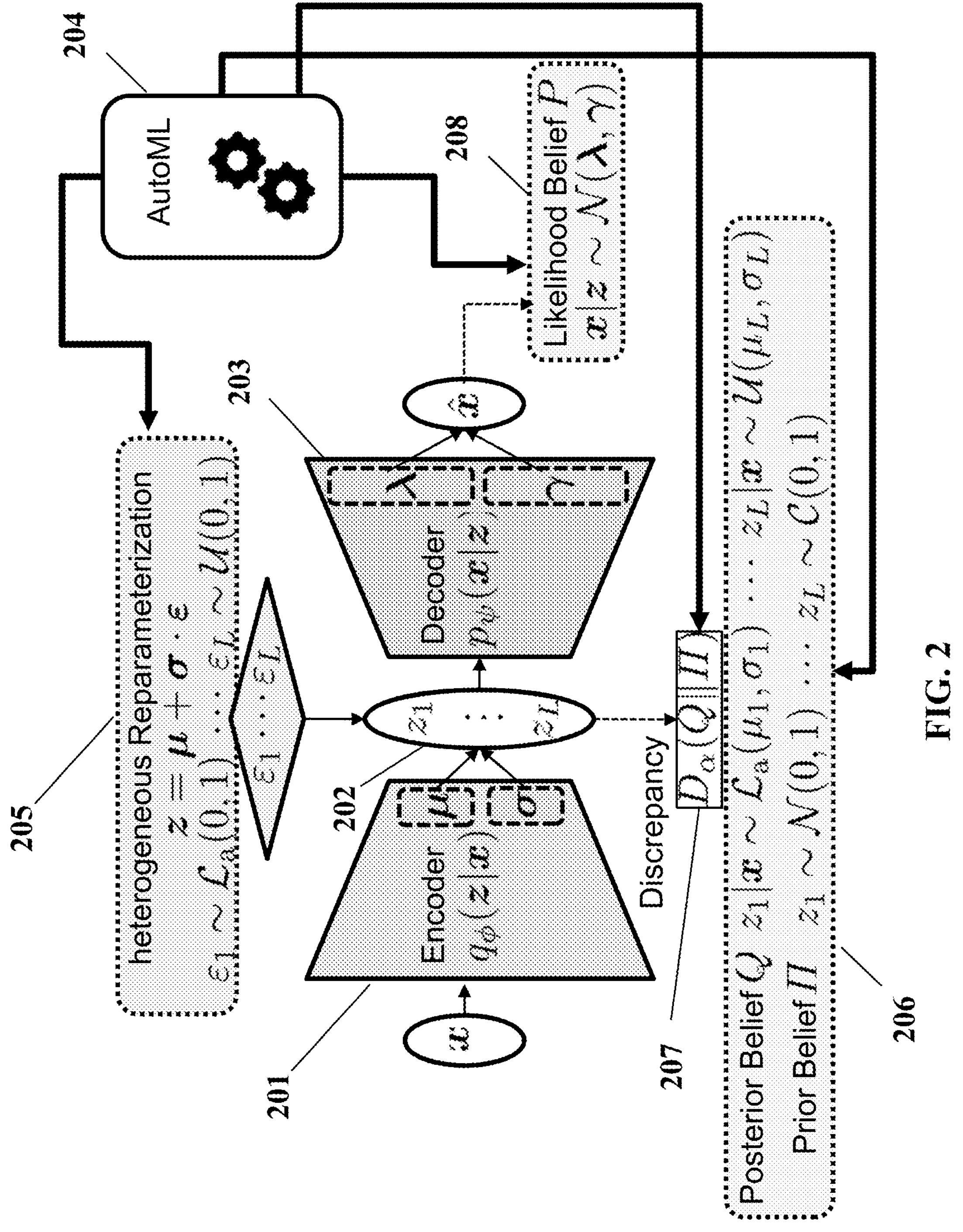
FIG. 2 shows an exemplar schematic for automated VAE, according to some embodiments.

FIG. 2 shows an exemplar schematic for automated VAE, according to some embodiments. While the generalized variational inference (GVI) offers great degrees of freedom, it in turn makes difficult to design proper selections of probabilistic models in addition to other architecture hyperparameters. To resolve the issue, the present invention uses the automated construction of stochastic DNN model. FIG. 2 shows such an example for automated VAE, also referred to as AutoVAE, which facilitates finding a proper choice of posterior, prior, likelihood, and discrepancy measure by using an automated machine learning (AutoML) framework based on a hypergradient method. Although the normal distribution is often used for latent sampling in stochastic nodes for the standard VAE, it is not always optimal when the underlying uncertainty in the datasets is complicated or unknown. The present invention provides a way to improve the VAE model by allowing irregular beliefs for the stochastic nodes. By exploring diverse settings of irregular beliefs, the variational Renyi (VR) bound can be improved by mismatched pairing, e.g., when the logistic distribution is used as a posterior belief at the VAE encoder despite that the VAE decoder assumes the normal distribution as a prior belief.

The VAE uses an encoder block 201 and a decoder block 203 to reproduce the data signals from latent variables 202. The last nodes of the VAE encoder are stochastic nodes, which provide variational parameters to follow a specific probability distribution given the data signals. The VAE encoder thus represents a posterior belief specified by the variational parameters such as location, scale, and shapes. For example, the first half of output nodes of the VAE encoder are location parameters and the last half of the output nodes of the VAE encoder are scale parameters. The latent variables 202 are then sampled by a random number generator, to follow the posterior belief by reparameterization trick 205, where random numbers sampled from a standard distribution are scaled and translated by the variational parameters generated by the VAE encoder.

The VAE decoder takes the sampled latent variables 202 to generates the estimated data signals. The last nodes of the VAE decoder are stochastic nodes, which provide variational parameters to follow a specific probability distribution given the latent samples. The VAE decoder thus represents a likelihood belief 208 specified by the variational parameters such as location, scale, and shapes. For example, the output nodes of the VAE decoder are location parameters of the normal distribution while the scale parameters are unspecified constants, i.e., the generalized NLL loss is reduced to MSE loss.

The VAE encoder and decoder are jointly trained by a gradient method such that the evidence lower bound (ELBO) is maximized, where the evidence lower bound is a function of the generalized NLL loss and a discrepancy 207 between the posterior and prior beliefs 206. The discrepancy term works as a regularization of the stochastic nodes to control the probability distribution. Once the VAE encoder and decoder are trained, the VAE decoder can be used as a generative model to produce synthetic signals close to the original datasets, by feeding random numbers sampled from a prior belief. Some embodiments of the present invention use on-the-fly adaptation of the prior belief to sample the latent variables from different probability distributions between training and testing datasets.

The AutoVAE uses AutoML framework 204 to explore diverse combinations of posterior belief, prior belief, likelihood belief, and discrepancy measure by using a hypergradient method such that the highest ELBO is achieved. This AutoVAE system enables various irregular pairing for stochastic nodes: e.g., i) a matched pairing uses the same probability distribution for posterior and prior beliefs; ii) a mismatched pairing uses different probability distributions for posterior and prior beliefs; iii) a heterogenous pairing uses different probabilisitc distributions for posterior and prior beliefs in individual stochastic nodes nonuniformly. FIG. 3 shows exemplar variants of irregular beliefs, according to some embodiments. The first variant 301 in FIG. 3 is a case when the posterior belief and prior belief are matched to be the Laplace distribution. The second variant 302 in FIG. 3 is a case when the posterior belief using the Laplace distribution is mismatched with the prior belief using the normal distribution. The third variant 303 in FIG. 3 is a case when the stochastic nodes are heterogenous, specifically the first half of latent variables uses different posterior-prior pairs from the last half of the latent variables. The use of such irregular beliefs offers a benefit that the expressive capability of the stochastic DNN model can be greatly enhanced and thus more complicated statistics can be modeled efficiently. In addition, the standard KLD regularization can be significantly extended by exploring discrepancy measures over Renyi's alpha-divergence, beta-divergence, gamma-divergence and so on.

FIG. 4A shows exemplar beliefs for posterior, prior, and likelihood distributions used for stochastic DNNs, according to some embodiments. The corresponding notations of various random distributions and its expression of probability density function (PDF) are listed for convention. Some distributions are specified with a single variational parameter; e.g., scale for the exponential distribution. Some distributions are specified with two variational parameters; e.g., location and scale for the Laplace distribution. For some embodiments, more than 2 variational parameters of shapes are also used for other distributions, including but not limited to the skew normal, exponential power, hyperbolic, gamma, Johnson, Pearson, Student-t, and Pareto distributions. Some distributions belong with the location-scale family (LSF), which is suited for variational sampling because the non-standard distribution can be easily generated by a standard distribution through the use of reparameterization trick. For discrete probability distributions such as Gumbel distribution, a modified reparameterization trick called the softmax trick is used with a variational parameter called a temperature, to adjust a sharpness towards one-hot encoding samples.

As an example, let $x \in \mathbb{R}^N$ be an N-dimensional data input to the VAE encoder. The encoder generates variational parameters such as location, scale, and shapes of a posterior belief hypothesis to determine an L-dimensional latent variable $z \in \mathbb{R}^L$. The latent variable is then input to the VAE decoder to generate variational parameters of a likelihood belief hypothesis to determine a reconstructed data $x' \in \mathbb{R}^N$. The encoder and decoder are configured with parameterized DNNs, mapping as $q_\varphi$: $x \rightarrow z$ and $p_\varphi$: $z \rightarrow x'$, respectively, with $\varphi$ and $\psi$ being trainable parameters of the DNNs such as weights and biases. The DNN tries to minimize a reconstruction loss, which would be typically negative log-likelihood (NLL) under the likelihood belief hypothesis.

For a given choice of parameters $\varphi$ and $\psi$, the VAE encoder and decoder models imply a conditional distribution as known as posterior $q_\varphi(z|x)$ and a conditional distribution as known as likelihood $p_\varphi(x|z)$, respectively. Letting $\pi(z)$ be a probabilisty distribution for the latent variable z under a hypothesis of prior belief, the VAE tries to maximize the marginal distribution $P_\psi(x)$, given by $$Pr(X)=\int p_\varphi(x|z)\pi(z)dz$$

which is generally intractable to compute exactly. While it could be possible to approximate the integration with sampling of z, the crux of the VAE approach is to utilize a variational lower-bound of the posterior $q_\varphi(z|x)$ implied by the generative model $p_\psi(x|z)$ with the VAE decoder. With $q_\psi(z|x)$ representing the variational approximation of the posterior with the VAE encoder, the evidence lower-bound (ELBO) is given by $$\log Pr(x) = \log \mathbb{E}_{z\sim q_\phi(z|x)}\left[\frac{p_\psi(x\mid z)\pi(z)}{q_\phi(z\mid x)}\right] \geq \mathbb{E}_{z\sim q_\phi(z|x)}\left[\log \frac{p_\psi(x\mid z)\pi(z)}{q_\phi(z\mid x)}\right] = \mathbb{E}_{z\sim q_\phi(z|x)}[\log p_\psi(x\mid z)] - D_{KL}(q_\phi(z\mid x)\|\pi(z))$$

where $D_{KL}(Q|\pi)$ denotes the KLD, measuring discrepancy between the posterior and prior beliefs, defined as $$D_{KL}(Q\|\textstyle\prod) = \mathbb{E}_{z\sim Q}\left[\log\left(\frac{Q(z)}{\prod(z)}\right)\right].$$

The VAE encoder and decoder are jointly trained such that the ELBO is maximized under the variational Bayes framework.

In the ELBO, there are four important factors to specify: likelihood belief $P=p_\psi(x|z)$; posterior belief $Q=q_\varphi(z|x)$; prior belief $\pi=\pi(z)$; and discrepancy measure $D=D_{KL}(.\|.)$. A standard VAE often uses the normal distribution (or Bernoulli distribution for nearly binary image reconstruction) for likelihood belief $P=N(\lambda, \gamma)$, and a specific KLD $D_{KL}(Q|\pi)$ to regularize latent variables by assuming the normal posterior Q=N(mu, sigma) and normal prior $\pi=N(0, 1)$. The present invention is based on the GVI to allow any arbitrary selections of generalized NLL loss, discrepancy measures, prior belief, and posterior belief. The standard VAE is asymptotically optimal for infinite dimension, while the optimality is no longer justified when likelihood/posterior/prior beliefs are misspecified or unspecified as opposed to the real data distribution.

Although an exponential-family prior belief will result into the same exponential-family posterior belief under some condition, the present invention provides an extended GVI by considering irregular beliefs such as a mismatched pairing for posterior-prior beliefs—e.g., logistic posterior and Laplace prior. Moreover, the generalized VAE allows another irregular beliefs using heterogeneous pairing—e.g., 30% latent nodes use Laplace-normal pairs and 70% nodes uniform-Cauchy pairs. Although non-Gaussian beliefs such as Laplace and Cauchy distributions are considered in some prior arts, irregular beliefs with mismatched or heterogeneous pairing has not been considered. To design such irregular VAEs, the present invention provides a convenient set of pairings that have closed-form differentiable expressions of KLD and straightforward reparameterization, without requiring high complexity like information autoregressive flow (IAF) and Gibbs sampling.

In prior arts, the normal distribution is the most widely used belief for stochastic DNNs, allowing simple sampling, a reparameterization trick, and a closed-form expression of KLD. In some embodiments of the current disclosure, we consider diverse alternatives such as a location-scale family LSF($\mu$, $\sigma$), which holds the same distribution within a transform with variational parameters of a location of $\mu\in R$ and a scale of $\sigma\in R+$. For instance, given a random variable F drawn as $\varepsilon\sim LSF(0,1)$, its translated random variable $Z=\mu+\sigma\cdot\varepsilon$ follows the same family as Z~LSF(p, $\sigma$). Here, a notation of '~' means 'is distributed to'. This transform is known as the reparameterization trick for variational sampling one of key enabling methods of stochastic DNN training to back-propagate a gradient for variational parameters p and a while keeping a target distribution in forward variational sampling.

Figure 4B:
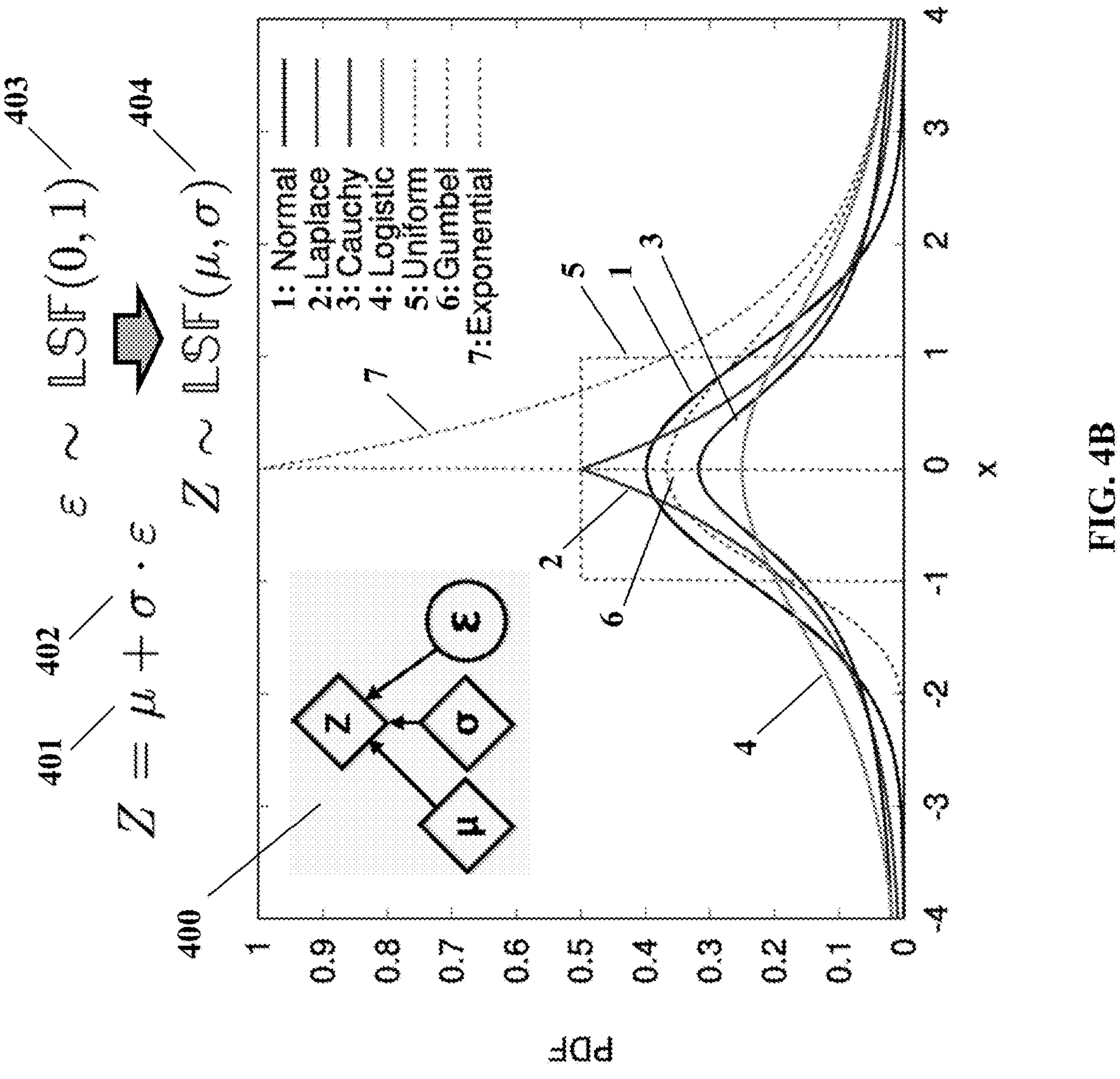
FIG. 4B shows exemplar standard location-scale family used for variational sampling based on reparameterization trick, according to some embodiments.

As shown in exemplar list of FIG. 4A, the present disclosure considers diverse set of beliefs including LSF distributions: normal N; Laplace La; Cauchy C; logistic Lo; uniform U; Gumbel G; and exponential E (which is not LSF but a scale family). FIG. 4B shows exemplar standard location-scale family used for variational sampling based on reparameterization trick, according to some embodiments. Some PDFs of its standard form LSF(0, 1) are plotted in FIG. 4B. These distributions are useful as a choice of potential posterior beliefs Q to generate a target non-standard distribution of LSF($\mu$, $\sigma$) 404 for the VAE encoder because of the simple reparameterization trick 400 by a transform of a standard random sample LSF(0,1) 403 with two variational parameters of location 401 and scale 402. For example, sampling the logistic distribution can be done as $Z=\mu+\sigma\varepsilon\sim Lo(\mu, \sigma)$ for $\varepsilon=\log(V/W)\sim Lo(0,1)$ with V, W~E (1). The locations vector p E R and scales vector $\sigma\in R^L$ are produced from data x by the parametric VAE encoder, while the latent z is stochastically sampled by the transform from the standard random variables $\varepsilon\sim LSF(0, 1)^L$.

Figure 5A:
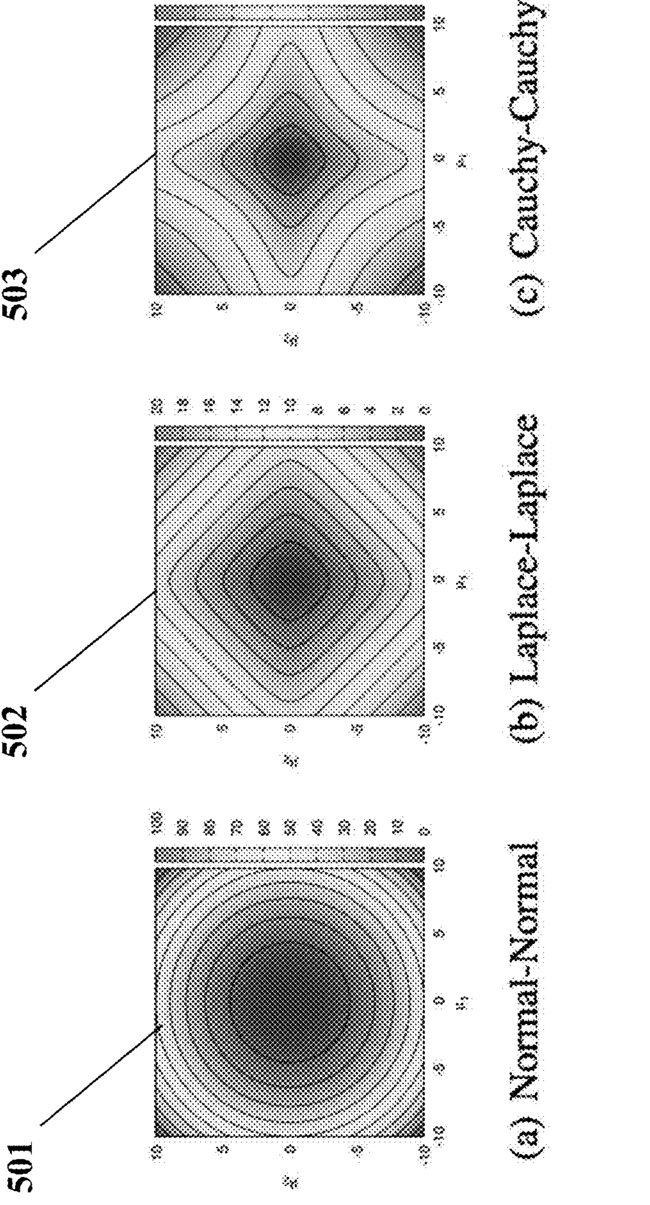
FIG. 5A shows exemplar landscapes of KLD discrepancy for various pairs of posterior belief and prior belief at two independent stochastic nodes, according to some embodiments.

For the choice of prior beliefs $\pi=\pi(z)$ used in generative models with the VAE decoder, we typically use the standard normal distribution N(0,1), or a matched standard prior $\pi$=LSF(0,1) for a particular choice of posterior belief Q=LSF($\mu$, $\sigma$). The stochastic nodes are then regularized to achieve the posterior distribution close to the prior distribution by a discrepancy measure such as KLD. FIG. 5A shows exemplar landscapes of KLD discrepancy for various pairs of posterior belief and prior belief at two independent stochastic nodes, according to some embodiments. For example, the KLD landscape for the pair of normal posterior and normal prior beliefs 501 is circularly isotropic symmetry over any axis to penalize samples having larger magnitudes to behave like a Gaussian distribution. For the pair of Laplace posterior and Laplace prior beliefs 502, the KDL landscape becomes non-isotropic to be rounded square-shaped, that promotes sparse regularization. For another pair of Cauchy posterior and Cauchy prior beliefs 503, the KLD landscape is shaped like a rounded cross, that promotes even sparser regularization in general.

While we can select any arbitrary distribution for the prior belief regardless of the posterior belief, it is desirable to have a closed-form simple expression of KLD to measure the discrepancy between posterior Q and prior H. In some embodiments, we consider such pairs of posterior belief and prior belief. FIG. 5B shows exemplar pairs of posterior belief and prior belief quantified by KLD discrepancy measure, according to some embodiments. In FIG. 5B, the closed-form expression of KLD discrepancy measure for some pairs of posterior belief and prior belief is listed for convention. For some embodiments the KLD is also obtained by numerical integration via pariational sampling and accumulation for other irregular beliefs.

Yet another embodiment uses on-the-fly adaptive prior modifications after the VAE was trained. For example, the distribution of the latent variables for the optimized VAE encoder can eventually have different distributions than the target prior distribution. To resolve the mismatch issue, the prior belief is modified when synthetically generating new data, depending on some statistics information such as mean, variance, and skewness of latent variables to match for a newly available dataset.

Figure 5C:
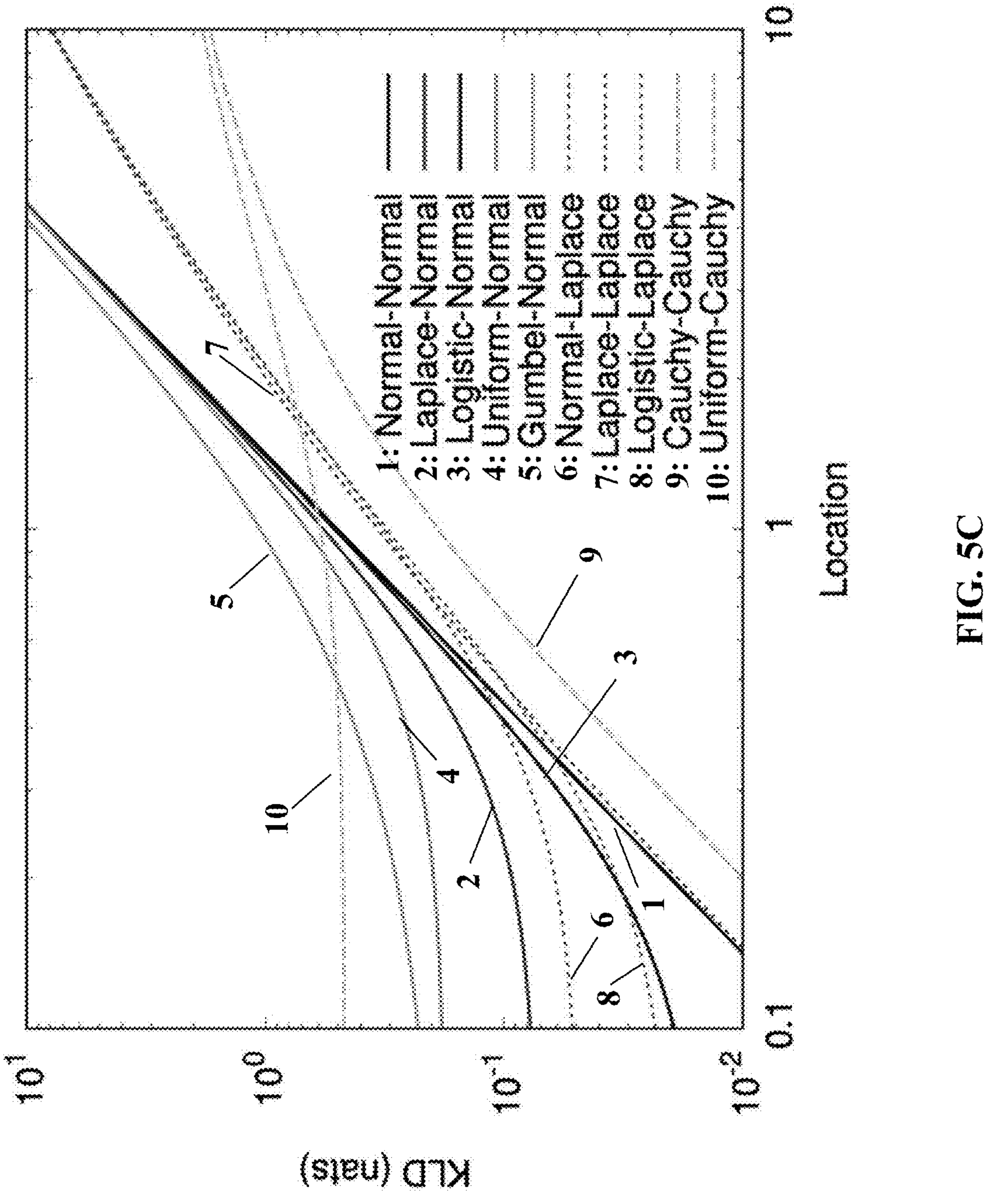
FIG. 5C shows exemplar KLD characteristics for various pairs of posterior belief and prior belief as a function of location value, according to some embodiments.

While a matched posterior-prior pairing has smaller KLD in general, mismatched pairs are not necessarily worse than the matched posterior-prior pairing. FIG. 5C shows exemplar KLD characteristics for various pairs of posterior belief and prior belief as a function of location value, according to some embodiments. For example, the mismatched pair of logistic-Laplace beliefs has slightly smaller KLD than the matched pair of Laplace-Laplace beliefs at a moderate location value. More importantly, those mismatched cases have sufficiently small KLD values for a wide range of location p. Because the KLD value cannot be exactly zero unless $\mu=0$ and $\sigma=1$ even for matched pairs, minimizing the KLD term is not necessarily important. It implies that there is a higher chance that exploring different irregular pairing may offer better ELBO than the conventional regular pairing in the end because of the higher degrees of freedom in adjusting the KLD landscape and ELBO. The invention is based on this recognition.

Note that the KLD is the most commonly used discrepancy measure to assess the 'difference' between the posterior Q and prior H for VAE. However, besides KLD, the stochastic DNN can use various other discrepancy measures, including the Fisher, Jeffrey, Renyi's α-, β-, and γ-divergences. In particular, the Renyi's α-divergence is useful since it covers many variants such as importance-weighted autoencoder (IWAE) and the standard VAE as a special case when adjusting the divergence order alpha. FIG. 6 shows exemplar discrepancy measures based on Renyi's α-divergence, which covers variants of generalized variational inference including importance-weighted autoencoder (IWAE) and standard VAE, according to some embodiments. For example, the α-divergence $D_a(Q//\pi)$ is reduced to the KLD $D_{KL}(Q//\pi)$ when $\alpha\to1$. For another example, the alpha divergence is reduced to a variant of Hellinger distance and chi-square divergence. The Renyi divergence of order $\alpha\geq0$ is expressed as $$D_\alpha\left(Q\middle\|\prod\right) = \frac{1}{\alpha-1}\log \mathbb{E}_{z\sim Q}\left[\left(\frac{Q(z)}{\prod(z)}\right)^{\alpha-1}\right].$$

More importantly, it was shown that the ELBO based on the Renyi divergence has a tighter bound than KLD case ($\alpha\to1$). Specifically, the variational Renyi (VR) bound is approximated by an importance-weighted accumulation of K-times variational samples $z_k\sim p_\varphi(z|x)$ as follows:

$$\hat{\mathcal{L}}_{\alpha,K} = \frac{1}{1-\alpha}\log\frac{1}{K}\sum_{k=1}^{K}\left(\frac{p_\psi(x\mid z_k)\pi(z_k)}{q_\phi(z_k\mid x)}\right)^{1-\alpha}.$$

The IWAE is a special case of the VR framework with $\alpha=0$, and it converges to the marginal probability when $K\to\infty$. As α-divergence is closely related to KLD, the aforementioned pairs in FIG. 5B have also closed-form expressions of alpha-divergence. Accordingly, some embodiments use the Renyi's α-divergence as a generalized discrepancy measure, where the Renyi order alpha is adjusted to find the best ELBO.

For VAE, any differentiable loss measures can be used as a reconstruction loss in practice; e.g., mean-square error (MSE), mean-absolute error (MAE), and binary cross-entropy (BCE) besides NLL. Nevertheless, most loss functions are closely related to generalized NLL under a specific likelihood belief $P=p_\psi(x|z)$ to represent the generative model of the data via the VAE decoder. FIG. 7 shows exemplar likelihood beliefs P for stochastic DNNs to determine generalized negative-log likelihood loss, according to some embodiments. Various likelihood beliefs P for stochastic DNNs are listed in FIG. 7, where the generalized NLL loss is specified for different likelihood beliefs. For example, BCE is often used for nearly binary images such as MNIST dataset. The BCE is equivalent to the NLL under the likelihood belief based on Bernoulli distribution B(λ). Some embodiments use the beta distribution Be as a proper likelihood belief, while some embodiments use its modified belief called continuous Bernoulli distribution CB to improve the VAE for not-strictly binary images. MSE corresponds to NLL under the normal distribution likelihood N(x',*) when omitting an unspecified variance. MAE corresponds to NLL under Laplace distribution likelihood La(x',*) when omitting an unspecified scale.

The VAE decoder may require multiple variational outputs such as location, scale, and shapes to generate x' given likelihood belief P. For example, the normal distribution likelihood $P=N(\lambda, \gamma)$ provides the mean as the reconstructed data $x'=\lambda$ and its standard deviation of γ as a confidence. Likewise, some embodiments use $x'=\lambda$ for the Laplace distribution in the sense of maximum likelihood. For another example, the beta distribution as the likelihood belief has also two variational parameters to be generated by the VAE decoder. In general, given the decoder outputs of variational parameters (λ, γ, etc.), the data reconstruction should be done by its mode (i.e., the peak of PDF). Although for Bernoulli likelihood B(λ), the mode is binary as $x'=0$ or 1 depending on λ, some embodiments use a mean instead as the reconstruction $x'=\lambda$. For some embodiments, the output of the stochastic DNN after multiple variational sampling is accumulated with a weighted average to improve the accuracy of the variational inference.

The VAE and its variant for the stochastic DNN models need to specify four stochastic factors: posterior belief Q; prior belief π; likelihood belief P; and discrepancy measure D. To design those factors, we often need manual efforts in searching for the best combinations of different likelihood beliefs as listed in FIG. 7, different posterior-prior pairs as listed in FIG. 5B, and different divergence order $\alpha>0$ as listed in FIG. 6. The searching space will be rapidly grown when we consider irregular, inhomogeneous, and mismatched pairing at each latent node. The current invention facilitates the design of such heterogenous stochastic DNNs by using an AutoML framework to explore those factors for VAE design in an automated fashion as shown in FIG. 2 we refer to this concept as AutoVAE.

Exemplar Model Implementation

The uncommon irregular pairing of posterior-prior beliefs such as logistic-normal or Laplace-normal can outperform the common choice of normal-normal pair, when exploring the best divergence order α. The irregular heterogenous pairing explored in AutoVAE can further achieve better performance because of higher degrees of freedom. For example as an exemplar model implementation, the posterior-prior beliefs are mixed in a heterogenous manner by AutoVAE as logistic-normal (Lo//N), Laplace-normal (La//N), and Laplace-Laplace (La//La) pairs, respectively, for 50%, 30% and 20% of latent variables, to achieve higher ELBO performance than standard VAE when analyzing a practical benchmark dataset of MNIST.

Some embodiments use a simple VAE architecture based on a multi-layer perceptron (MLP) for encoder and decoder blocks, where MLP is composed of a few fully-connected linear layers with hundreds of hidden nodes having rectified linear unit (ReLU) activation. For example, two-layer MLP having 400 hidden nodes is used both for the VAE encoder and the VAE decoder. The number of latent nodes is chosen to be around tens depending on the datasets for some embodiments. For example, L=20 stochastic nodes are used. Some embodiments use a gradient method based on the adaptive momentum gradient optimization with a learning rate of 0.01 over 100 epochs at a mini-batch size of 1000. AutoML can also design such hyperparameters on top of irregular beliefs by using a hypergradient method such as Bayesian optimization for example.

Once the VAE is trained, the VAE decoder can be used as a generative model to reproduce synthetic data by feeding random samples drawn from the prior belief H for some embodiments. For example, the generated images are evaluated by Frechet inception distance (FID) and kernel inception distance (KID) to assess its natural distribution from the original image dataset. To evaluate the inception scores, some embodiments generate 50,000 images by sampling random latent variables z from prior beliefs H.

FIG. 8A shows exemplar characteristics for various combinations of posterior belief, prior belief, likelihood belief, and discrepancy measures for generalized VAE model, according to some embodiments. More specifically, FIG. 8A shows results of mismatched VAEs under various combinations of likelihood, posterior, and prior beliefs after training for the benchmark MNIST dataset. For MSE loss based on the likelihood belief of the unspecified normal distribution P=N(λ, *), the ELBO performance (for an order of alpha=1 and an accumulation number of K=1) of regular normal-normal pair can be improved by exploring different pairing, such as logistic-normal, Laplace-Laplace, and logistic-Laplace pairs. MSE and inception scores are also improved, e.g., by the irregular beliefs of logistic-normal pair. When exploring different likelihood beliefs, we can achieve benefits of mismatched pairing even more clearly. Moreover, an irregular inhomogeneous use of posterior-prior pairs at individual latent nodes (denoted as 'Auto') can further improve the performance via automatic exploration of mixed pairs for irregular beliefs in some cases.

Figure 8B:
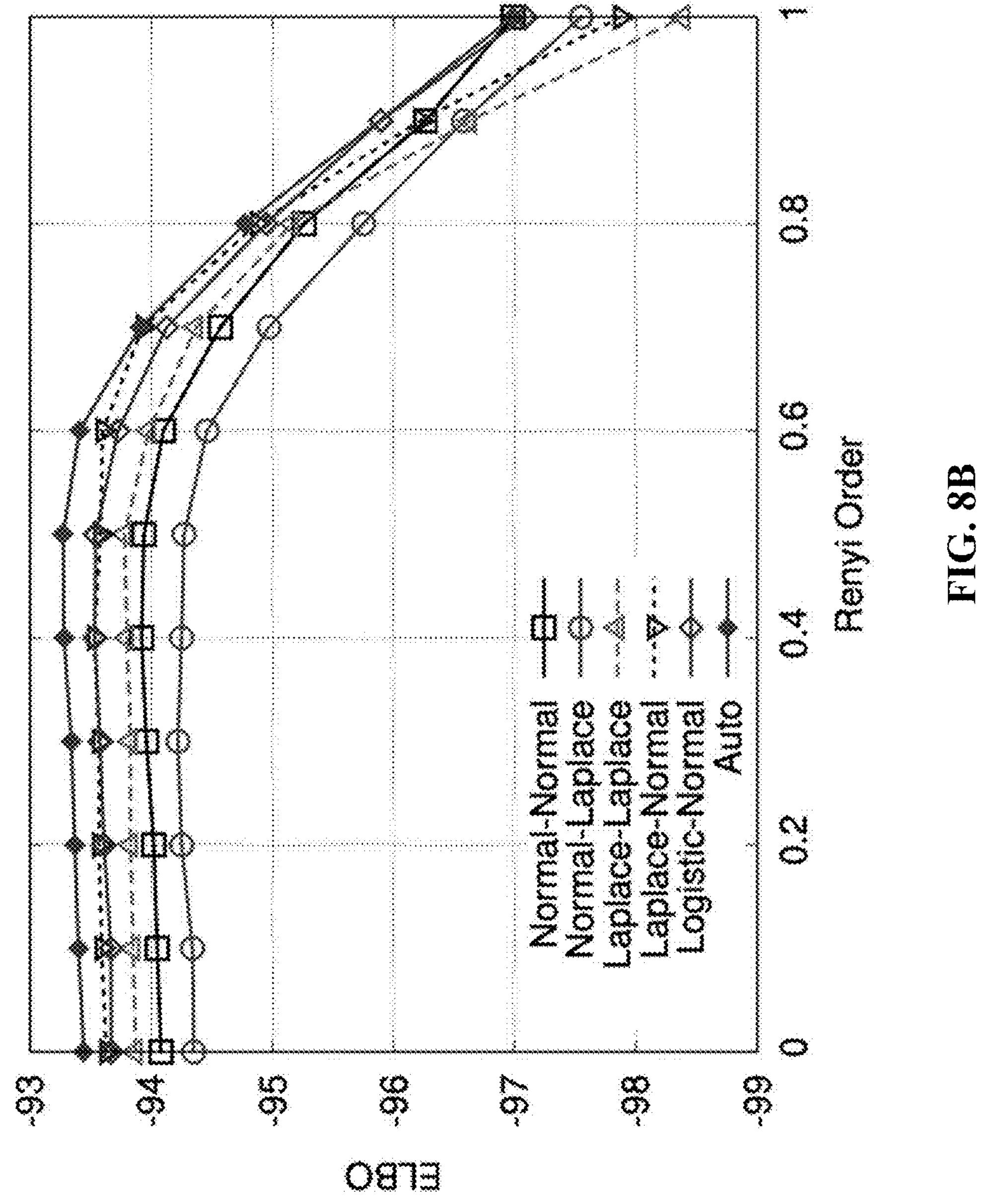
FIG. 8B shows exemplar ELBO characteristics for various pairs of posterior belief and prior belief as a function of divergence order for generalized VAE model, according to some embodiments.

In addition, exploring the Renyi order α, the VR bound can be further improved. FIG. 8B shows exemplar ELBO characteristics for various pairs of posterior belief and prior belief as a function of divergence order for generalized VAE model, according to some embodiments. Specifically, FIG. 8B shows the benefit of exploring different discrepancy measures by adjusting the divergence order α for some embodiments. FIG. 8B demonstrates that uncommon pairing of posterior and prior beliefs such as logistic-normal or Laplace-normal can outperform common choice of normal-normal pair, when exploring the best divergence order α. It is also confirmed that irregular beliefs pairing explored in AutoVAE achieves the best performance for the MNIST datasets. The best posterior-prior mixture in heterogenous allocation was logistic-normal (Lo//N), Laplace-normal (La//N), and Laplace-Laplace (La//La) pairs, respectively, for 50%, 30%, and 20% of L=20 latent nodes at a Renyi divergence order of α=0.5. This exemplar result clearly shows the benefit of the invention which uses irregular beliefs for stochastic DNN models by allowing mismatched pairing and heterogenous pairing with adjustable discrepancy measures.

Figure 8C:
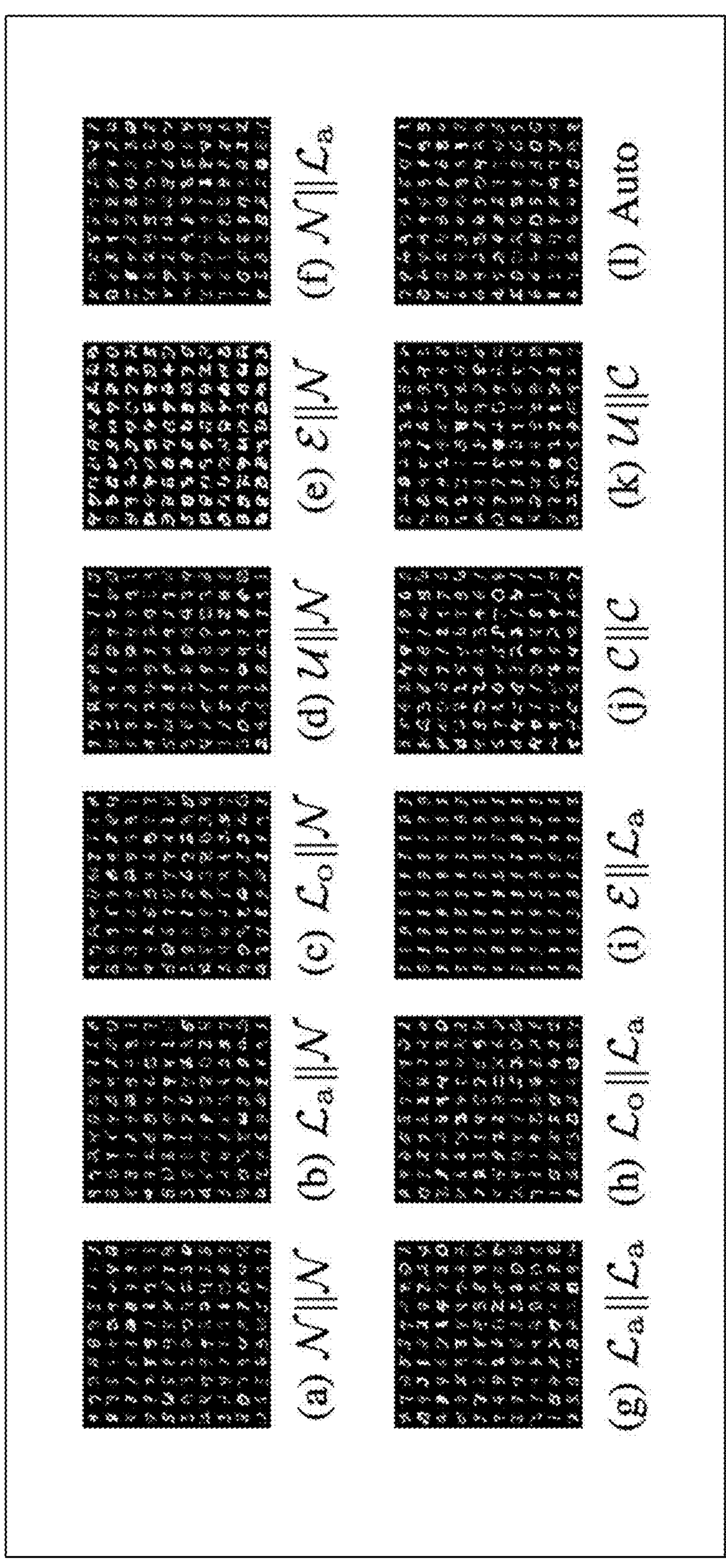
FIG. 8C shows exemplar image snapshots generated by generalized VAE decoder with variational sampling according to a prior belief after trained with various pairs of posterior belief and prior belief, according to some embodiments.

FIG. 8C shows exemplar image snapshots generated by generalized VAE decoder with variational sampling according to a prior belief after trained with various pairs of posterior belief and prior belief, according to some embodiments. Specifically, FIG. 8C shows synthetic image snapshots of randomly generated images by using the trained VAE decoder for the MNIST datasets. By exploring different combinations of posterior belief, prior belief, likelihood beliefs, and discrepancy measures, the generator model can be significantly improved, in particular with heterogenous pairing designed by the AutoML framework. Similar benefits can be achieved for different datasets. The present invention uses mismatched, heterogenous, and irregular combinations of posterior-prior-likelihood beliefs for generalized VAE design. The mismatched VAE can outperform standard VAE by using the automated exploration of the irregular beliefs. In addition, the system and method of the present invention explores different discrepancy measures by adjusting divergence order for some embodiments. The concept of AutoVAE can facilitate searching for proper combinations of those stochastic factors to configure generalized VAE models for variational inference. The irregular beliefs pairing technique is also applicable to other stochastic DNNs besides VAEs.

Exemplar Stochastic DNN Models

Besides VAE, the stochastic DNN model includes but not limited to variational information bottleneck (VIB), denoising diffusion probabilistic model (DDPM), and variational Bayesian neural network for some embodiments. VIB uses similar but different approach of VAE, where VIB is suited for supervised learning and VAE is suited for unsupervised learning. The stochastic nodes of VIB are specified by the irregular beliefs in an analogous way of AutoVAE, and thus some embodiments use automated exploration of irregular beliefs at VIB to improve the performance. DDPM is another stochastic DNN model similar to VAE, but with a large number of variational sampling at diffusion steps. Likewise the AutoVAE, some embodiments use automated exploration of irregular beliefs to realize mismatched and heterogenous pairing at stochastic nodes at each diffusion step. Similarly, besides VAE, VIB, and DDPM, some embodiments use different stochastic DNN models when involving stochastic nodes under a particular assumption of underlying probabilisitc beliefs.

Figures 9A, 9B:
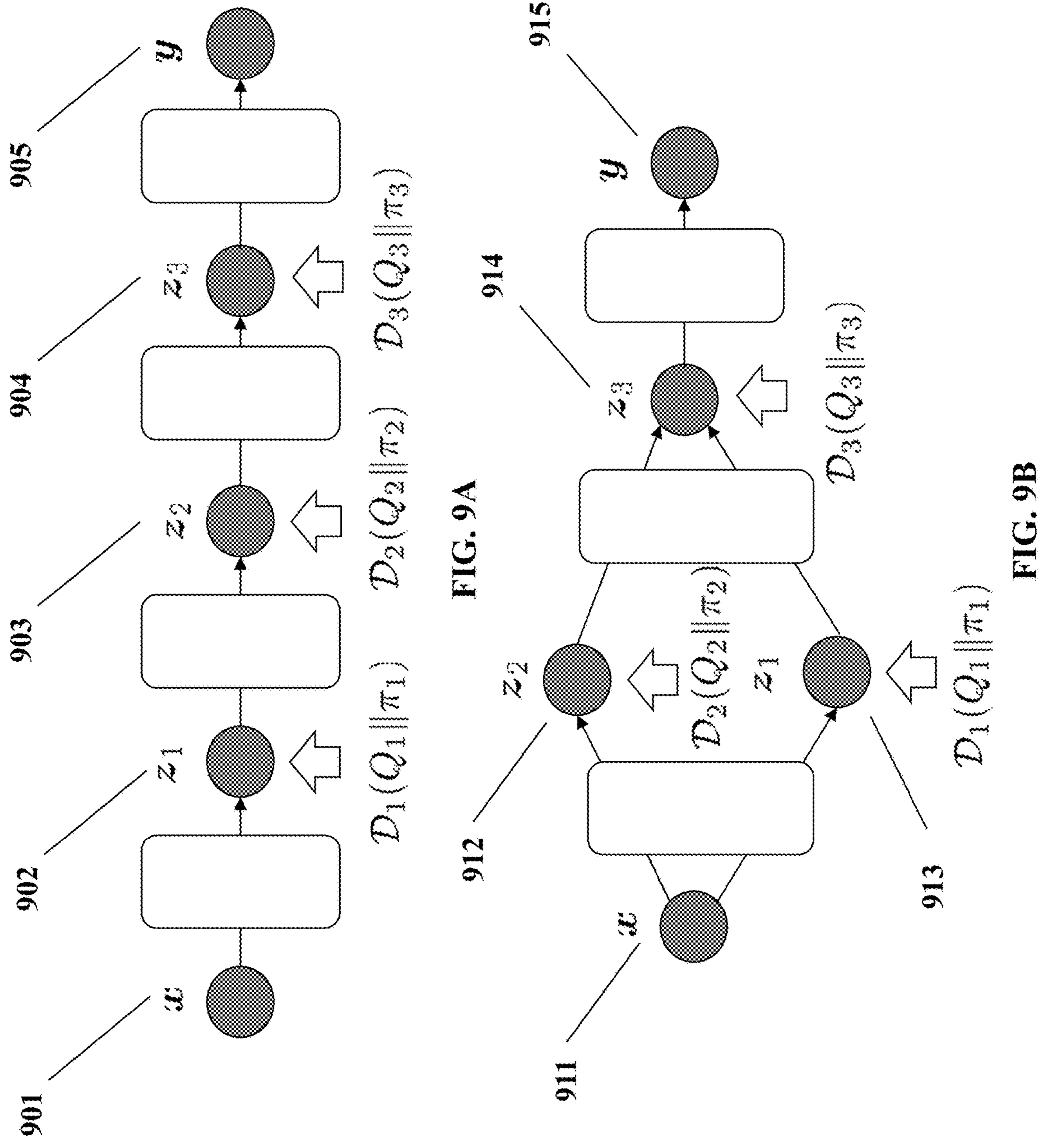
FIG. 9A shows an exemplar stochastic DNN using multiple different beliefs and discrepancy measures at multiple intermediate layers in sequence, according to some embodiments.
FIG. 9B shows an exemplar stochastic DNN using different beliefs and discrepancy measures at different stochastic nodes within one intermediate layer in parallel and at multiple intermediate layers in sequence, according to some embodiments.

FIG. 9A shows an exemplar stochastic DNN using multiple different beliefs and discrepancy measures at multiple intermediate layers in sequence, according to some embodiments. This exemplar stochastc DNN model in FIG. 9A takes a data x 901 to generate a variational inference for a task label y 905, through multiple DNN blocks in sequence, where some hidden layers are stochastic nodes using variational sampling according to individually specified beliefs. For example, the first stochastic nodes $z_1$ 902 uses normal distribution for posterior belief, uniform distribution for prior belief with KLD discrepancy; the second stochastic nodes $z_2$ 903 uses Cauchy distribution for both posterior and prior beliefs with Renyi alpha-divergence of order 0.5; the third stochastic nodes $z_3$ 904 uses logistic distribution for posterior belief and normal distribution for prior belief with beta-divergence of order 0.2. Such a stochast DNN having multiple stochastic layers in sequence provides more complicated uncertainty models and the heterogenous beliefs can further improve the capability of stochastic modeling for variational inference.

FIG. 9B shows an exemplar stochastic DNN using different beliefs and discrepancy measures at different stochastic nodes within one intermediate layer in parallel and at multiple intermediate layers in sequence, according to some embodiments. This exemplar stochastic DNN model realizes heterogenous beliefs within one stochastic layer to provide a variational inference y 915 from a data x 911 through multiple DNN blocks with stochastic nodes $z_1$ 912 and $z_2$ 913 in pararrel, in addition to $z_3$ 914 in sequence. Specifically, the parallel stochastic nodes $z_1$ 912 and $z_2$ 913 are heterogenously specified by different beliefs and divergence metrics. Many other possibilities to connect multiple DNN blocks with multiple stochastic nodes are explored with a hypergradient method for some embodiments to realize high-performance generalized variational inference models.

Each of the stochastic DNN blocks is configured with hyperparameters to specify a set of layers with neuron nodes, mutually connected with trainable variables to pass a signal from the layers to layers sequentially. The trainable variables are numerically optimized with the gradient methods, such as stochastic gradient descent, adaptive momentum, Ada gradient, Ada bound, Nesterov accelerated gradient, and root-mean-square propagation. The gradient methods update the trainable parameters of the DNN blocks by using the training data such that output of the DNN blocks provide smaller loss values such as mean-square error, cross entropy, structural similarity, negative log-likelihood, absolute error, cross covariance, clustering loss, divergence, hinge loss, Huber loss, negative sampling, Wasserstein distance, and triplet loss. Multiple loss functions are further weighted to combine with some regularization coefficients according to a training schedule policy.

In some embodiments, the stochastic DNN block is reconfigurable according to the hyperparameters such that the DNN blocks are configured with a set of fully-connect layer, convolutional layer, graph convolutional layer, recurrent layer, loopy connection, skip connection, and inception layer with a set of nonlinear activations including rectified linear variants, hyperbolic tangent, sigmoid, gated linear, softmax, and threshold. The DNN blocks are further regularized with a set of dropout, swap out, zone out, block out, drop connect, noise injection, shaking, and batch normalization. In yet another embodiment, the layer parameters are further quantized to reduce the size of memory as specified by the adjustable hyperparameters. For another embodiment of the link concatenation, the system uses multi-dimensional tensor projection with dimension-wise trainable linear filters to convert lower-dimensional signals to larger-dimensional signals for dimension-mismatched links.

Another embodiment integrates AutoML into AutoBayes and AutoTransfer for hyperparameter exploration of each DNN blocks and learning scheduling. Here, AutoTransfer uses exploration of different auxiliary regularization modules from diverse set of regularization methods including but not limited to adversarial censoring, mutual information gradient estimation, and Wyner distance. Note that AutoTransfer and AutoBayes can be readily integrated with AutoML based on a hypergradient method to optimize any hyperparameters of individual DNN blocks. More specifically, the system modifies hyperparameters by using reinforcement learning, evolutionary strategy, differential evolution, particle swarm, genetic algorithm, annealing, Bayesian optimization, hyperband, and multi-objective Lamarckian evolution, to explore different combinations of discrete and continues hyperparameter values.

The system of invention also provides further testing step to adapt as a post training step which refines the trained DNN blocks by unfreezing some trainable variables such that the DNN blocks can be robust to a new dataset with new nuisance variations such as new subject. This embodiment can reduce the requirement of calibration time for new users of HMI systems.

Exemplar System

Figure 10:
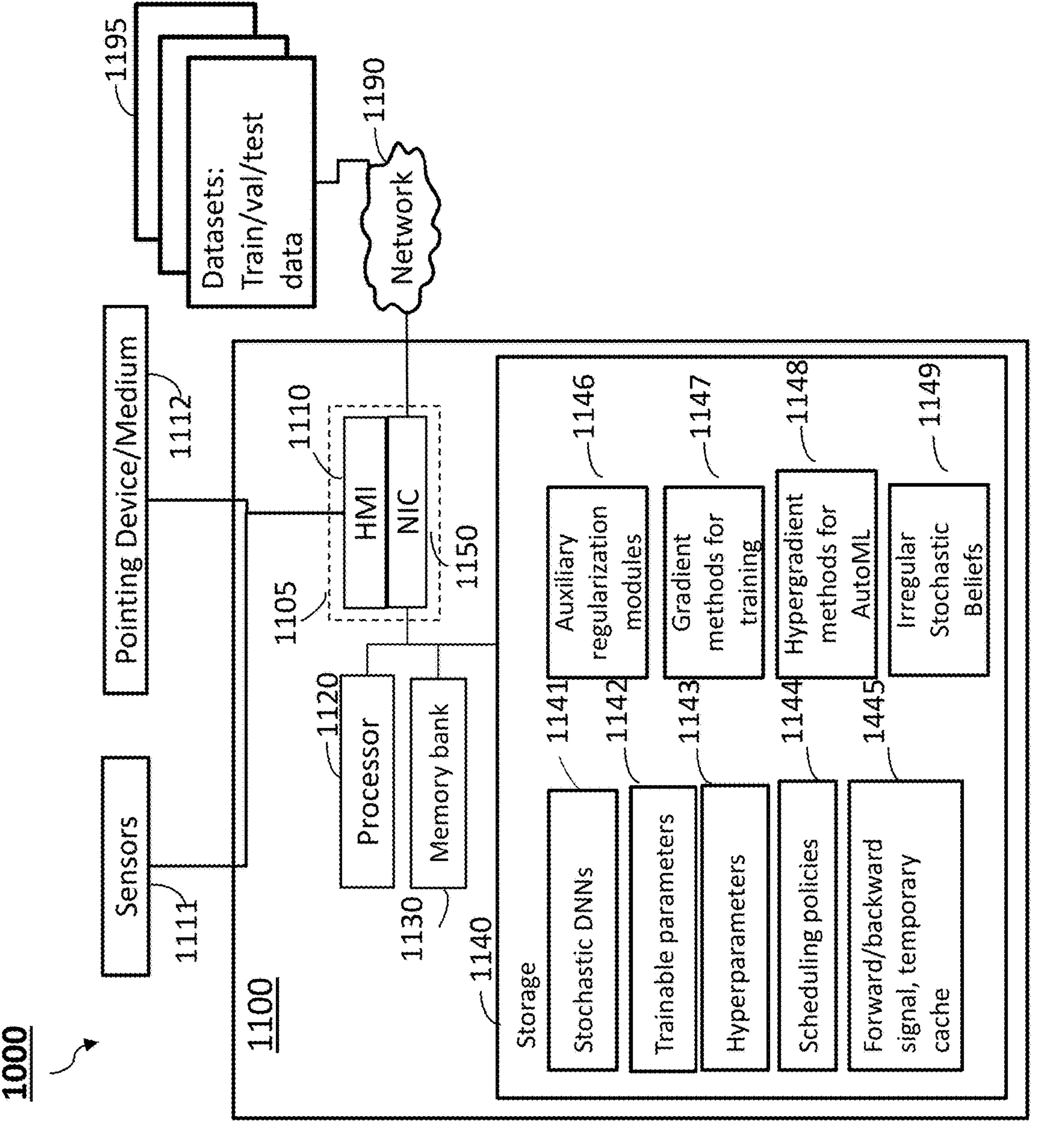
FIG. 10 shows a exemplar schematic of the system configured with processor, memory and interface, according to some embodiments.

FIG. 10 shows an exemplar schematic of the system configured with processor, memory and interface, according to some embodiments. Specifically, FIG. 10 is a block diagram illustrating an example of a system 1000 for signal analysis with automated configuration of stochastic DNNs. The system 1000 includes a device 1100, having a set of interfaces and data links 1105 configured to receive and send signals, at least one processor 1120, a memory (or a set of memory banks) 1130 and a storage 1140. The processor 1120 performs, in connection with the memory 1130, computer-executable programs and algorithms stored in the memory 1130 and the storage 1140. The set of interfaces and data links 1105 includes a human-machine interface (HMI) 1110 and a network interface controller 1150. The processor 1120 can perform the computer-executable programs and algorithms in connection with the memory 1130 that uploads the computer-executable programs and algorithms from the storage 1140. The computer-executable programs and algorithms stored in the storage 1140 use stochastic deep neural networks (DNNs) 1141, trainable parameters 1142, hyperparameters 1143, scheduling policies 1144, forward-pass signals/backward-pass gradients and other temporary caches 1145, regularization modules 1146, gradient methods for training 1147, hypergradient methods for AutoML 1148, and a set of irregular beliefs for stochastic nodes 1149. The processor executes a probabilistic inference to analyze the set of datasets by using the stochastic DNNs 1141, where the probabilistic inference uses an importance-weighted accumulation after variational sampling at stochastic nodes according to the set of irregular beliefs 1149.

The system 1000 receives the signals via the set of interfaces and data links 1105 over a network 1190. The signals include a set of datasets 1195 having data for training, validation and testing. The set of datasets includes a set of multi-dimensional signals X, associated with task labels Y to identify. For some embodiments, the set of datasets further includes other side information such as nuisance variations S.

In some cases, each of the stochastic DNN blocks 1141 is configured either for encoding the multi-dimensional signals X into latent variables Z, decoding the latent variables Z to reconstruct the multi-dimensional signals X, classifying the task labels Y, estimating the nuisance variations S, regularization the latent space by estimating the nuisance variations S, or selecting a graphical model. The memory banks further include intermediate neuron signals, and temporary computation values including forward-pass signals and backward-pass gradients.

The processor 1120 is configured to, in connection with the interface and the memory banks 1105, submit the signals and the datasets 1195 into the stochastic DNN blocks 1141 to perform exploring different irregular beliefs 1149 and different hyperparameters 1143 by using the hypergradient methods 1148. The processor 1120 further performs: configuring the stochastic DNNs 1141 according to the hyperparameters 1143; calculating a loss function by forward-propagating the datasets 195 across the stochastic DNNs 1141 according to the probabilistic inference; modifying the loss function by regularizing the stochastic nodes according to the discrepancy measures specified in irregular beliefs 149; backward-propagating a gradient of the loss function with respect to the trainable parameters 1142 across the stochastic DNNs 1141 to update the trainable parameters 1142 with gradient methods 147. The hypergradient methods for AutoMVL 1148 also explore different auxiliary regularization modules 1146, different hyperparameters 1143, different scheduling policies 1144, and irregular stochastic beliefs 1149 to improve the robustness against nuisance variations and unspecified uncertainty in the datasets 1195.

For some embodiments, the system 1000 is applied to design HMI through the analysis of user's physiological data. The system 1000 receives signals of physiological data 1195 via a network 1190 and the set of interfaces and data links 1105. In some embodiments, the system 1000 receives electroencephalogram (EEG) and electromyogram (EMG) measurements from a set of sensors 1111 as the user's physiological data, as well as other interface modules such as pointing device/medium 1112.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for signal analysis, comprising:

an interface configured to receive and send signals, wherein the signals include a set of datasets comprising a set of multi-dimensional signals associated with a set of task labels;

a stochastic deep neural network (DNN) block configured to identify the set of task labels from the set of multi-dimensional signals through a set of stochastic nodes, wherein the set of stochastic nodes is individually specified by a set of irregular beliefs for posterior, prior, and likelihood distributions quantified by a set of discrepancy measures;

a memory bank configured to store the set of datasets, the set of irregular beliefs, a set of hyperparameters, and a set of trainable parameters; and a processor, in connection with the interface and the memory bank, configured to execute a probabilistic inference to analyze the set of datasets by using the stochastic DNN block, wherein the probabilistic inference uses an importance-weighted accumulation after a variational sampling at the set of stochastic nodes according to the set of irregular beliefs.

2. The system of claim 1, wherein the stochastic DNN block includes a variant of variational autoencoder, variational information bottleneck, denoising diffusion probabilistic model, and variational Bayesian neural network, wherein the stochastic DNN block is configured with a combination of:

transform layers including fully-connected layer, bilinear layer, convolutional layer, graph convolutional layer, recurrent layer, implicit layer, attention layer, pooling layer, padding layer, inception layer, and transformer layer;

interconnections including loopy connection, skip addition, skip multiplication, and skip concatenation;

nonlinear activations including rectified linear variants, sigmoid variants, shrinkage variants, softmax variants, gated liner, soft plus, and soft sign; and regularization layers including dropout, swap out, zone out, block out, drop connect, shaking, shaffle, batch normalization, layer normalization, local response normalization, group normalization, and instance normalization.

3. The system of claim 1, wherein the variational sampling uses a random number generator based on a reparameterization trick according to a set of variational parameters including location, scale, shapes, and temperature specified by the set of irregular beliefs.

4. The system of claim 1, wherein the set of discrepancy measures includes a combination of Renyi's alpha divergence, beta divergence, gamma divergence, Fisher divergence, Jeffrey divergence, and a variant thereof.

5. The system of claim 1, wherein the set of hyperparameters includes:

a set of training hyperparameters determining a scheduling policy including learning rates, weight decays, gradient momentum, divergence orders, batch sizes, a number of epochs, early stopping, dropout rates, and regularization weights;

a set of architecture hyperparameters including a connectivity, a type of layer operations, a type of activation functions, a size of the set of trainable parameters, a choice of stochastic nodes, a number of layer depth, and a set of layer widths to determine the stochastic DNN block; and a set of deployment hyperparameters including an initialization policy for the set of trainable parameters and a quantization policy for the set of trainable parameters.

6. The system of claim 1, wherein the set of irregular beliefs includes a mismatched or heterogeneous combination of:

discrete univariate distributions, including Bernoulli, binomial, geometric, Pascal, hypergeometric, Waring Yule, Poisson, Skellam, discrete uniform, Zipf, log series, Benford, Polya, Tanner, and Poisson Consul distributions;

normal-related distributions, including normal, log normal, Johnson, half normal, skew normal, Voigt, Tsallis, hyperbolic, variance gamma, Student-t, chi, Rayleigh, Maxwell, chi-square, F-ratio, Fisher, Hotelling, and Tracy distributions;

exponential-related distributions, including exponential, Laplace, Lindley, logistic, sech, exponential power, shifted Gompertz, Erlang, hypoexponential, Coxian, gamma, Nakagami, Moyal, and Meixner distributions;

extreme-value distributions, including max stable, min stable, Gumbel, Frechet, and Weibull distributions;

bounded distributions, including uniform, arc-sine, Bates, Kumaraswamy, power, triangular, uniform sum, Mises, Wigner, and Pastur distributions;

heavy-tail distributions, including Pareto, Beta prime, Dagum, Davis, Singh Maddala, Cauchy, Landau, Levy, Benini, Gibrat, and Suzuki distributions;

quantile-based distributions, including Tukey, Wakeby distributions;

systematic distributions, including Pearson distribution;

multivariate continuous distributions, such as including multivariate normal, multinomial, multivariate-t, Dirichlet, and Copula distributions; and multivariate discrete distributions, including multivariate hypergeometric, negative multinomial, and multivariate Poisson distributions.

7. The system of claim 1, wherein the set of datasets includes a combination of:

media data including images, pictures, movies, texts, letters, voices, music, audios, and speeches;

physical data including radio waves, optical signals, electrical pulses, temperatures, pressures, accelerations, speeds, vibrations, and forces; and physiological data such as including heart rate, blood pressure, mass, moisture, electroencephalogram, electromyogram, electrocardiogram, mechanomyogram, electrooculogram, galvanic skin response, and magnetoencephalogram, electrocorticography.

8. The system of claim 1, wherein the processor further executes steps of:

configuring the stochastic DNN block by modifying the connectivity among the set of multi-dimensional signals, the set of task labels, and the set of stochastic nodes according to the set of hyperparameters;

calculating a loss function by forward-propagating the set of datasets across the stochastic DNN block according to the probabilistic inference;

modifying the loss function by regularizing the set of stochastic nodes according to the set of discrepancy measures;

backward-propagating a gradient of the loss function with respect to the set of trainable parameters across the stochastic DNN block; and updating the set of trainable parameters of the stochastic DNN block with a gradient method.

9. The system of claim 8, wherein the loss function is a combination of variational Renyi bound, evidence lowerbound, mean-square error, cross entropy, structural similarity, cosine similarity, negative log-likelihood, absolute error, cross covariance, clustering loss, divergence, hinge loss, Huber loss, negative sampling, Wasserstein distance, triplet loss, and a variant thereof.

10. The system of claim 8, wherein the gradient method employs a combination of stochastic gradient descent, adaptive momentum, Ada gradient, Ada bound, Nesterov accelerated gradient, root-mean-square propagation, and a variant thereof.

11. The system of claim 8, wherein the processor further executes the steps of exploring different values for the set of irregular beliefs and the set of hyperparameters in the memory bank by using a hypergradient method, wherein the hypergradient method employs a combination of reinforcement learning, implicit gradient, evolutionary strategy, differential evolution, particle swarm, genetic algorithm, simulated annealing, Bayesian optimization, and a variant thereof.

12. The system of claim 1, wherein the stochastic DNN block uses a heterogenous allocation of different beliefs for at least two disjoint sets of stochastic nodes within one layer.

13. The system of claim 1, wherein the stochastic DNN block uses a mismatched pair of posterior belief and prior belief for at least one set of stochastic nodes.

14. The system of claim 1, wherein the set of irregular beliefs is modified on the fly to use different probabilistic distributions for the variational sampling at the set of stochastic nodes in the stochastic DNN block when analyzing newly available set of datasets.

15. A computer-implemented method for data analysis comprising steps of:

feeding a set of data signals into a stochastic deep neural network (DNN), wherein the stochastic DNN comprises a set of layers and a set of stochastic nodes;

propagating the set of data signals according to the set of layers in the stochastic DNN, wherein the stochastic DNN employs a variational sampling at the set of stochastic nodes, wherein the set of stochastic nodes is individually specified by a set of irregular beliefs for posterior, prior, and likelihood distributions quantified by a set of discrepancy measures; and accumulating the output of the stochastic DNN as a probabilistic inference result.

16. The method of claim 15, wherein the stochastic DNN includes a variant of variational autoencoder, variational information bottleneck, denoising diffusion probabilistic model, and variational Bayesian neural network, wherein the stochastic DNN is configured with a combination of:

transform layers including fully-connected layer, bilinear layer, convolutional layer, graph convolutional layer, recurrent layer, implicit layer, attention layer, pooling layer, padding layer, inception layer, and transformer layer;

interconnections including loopy connection, skip addition, skip multiplication, and skip concatenation;

nonlinear activations including rectified linear variants, sigmoid variants, shrinkage variants, softmax variants, gated liner, soft plus, and soft sign; and regularization layers including dropout, swap out, zone out, block out, drop connect, shaking, shaffle, batch normalization, layer normalization, local response normalization, group normalization, and instance normalization.

17. The method of claim 15, wherein the variational sampling uses a random number generator based on a reparameterization trick according to a set of variational parameters including location, scale, shapes, and temperature specified by the set of irregular beliefs, wherein the set of irregular beliefs includes a mismatched or heterogeneous combination of:

discrete univariate distributions, including Bernoulli, binomial, geometric, Pascal, hypergeometric, Waring Yule, Poisson, Skellam, discrete uniform, Zipf, log series, Benford, Polya, Tanner, and Poisson Consul distributions;

normal-related distributions, including normal, log normal, Johnson, half normal, skew normal, Voigt, Tsallis, hyperbolic, variance gamma, Student-t, chi, Rayleigh, Maxwell, chi-square, F-ratio, Fisher, Hotelling, and Tracy distributions;

exponential-related distributions, including exponential, Laplace, Lindley, logistic, sech, exponential power, shifted Gompertz, Erlang, hypoexponential, Coxian, gamma, Nakagami, Moyal, and Meixner distributions;

extreme-value distributions, including max stable, min stable, Gumbel, Frechet, and Weibull distributions;

bounded distributions, including uniform, arc-sine, Bates, Kumaraswamy, power, triangular, uniform sum, Mises, Wigner, and Pastur distributions;

heavy-tail distributions, including Pareto, Beta prime, Dagum, Davis, Singh Maddala, Cauchy, Landau, Levy, Benini, Gibrat, and Suzuki distributions;

quantile-based distributions, including Tukey, Wakeby distributions;

systematic distributions, including Pearson distribution;

multivariate continuous distributions, including multivariate normal, multinomial, multivariate-t, Dirichlet, and Copula distributions; and multivariate discrete distributions, including multivariate hypergeometric, negative multinomial, and multivariate Poisson distributions.

18. The method of claim 15, further comprising steps of:

calculating a loss function based on a variational bound to regularize the set of stochastic nodes according to a set of discrepancy measures;

back-propagating a gradient of the loss function with respect to a set of trainable parameters; and updating the set of trainable parameters according to a gradient method, wherein the gradient method employs a combination of stochastic gradient descent, adaptive momentum, Ada gradient, Ada bound, Nesterov accelerated gradient, root-mean-square propagation, and a variant thereof.

19. The method of claim 18, wherein the set of discrepancy measures includes a combination of Renyi's alpha divergence, beta divergence, gamma divergence, Fisher divergence, Jeffrey divergence, and a variant thereof, wherein the loss function is a combination of variational Renyi bound, evidence lower-bound, mean-square error, cross entropy, structural similarity, cosine similarity, negative log-likelihood, absolute error, cross covariance, clustering loss, divergence, hinge loss, Huber loss, negative sampling, Wasserstein distance, triplet loss, and a variant thereof.

20. The method of claim 18, further comprising steps of exploring different values for the set of irregular beliefs according to a hypergradient method, wherein the hypergradient method employs a combination of reinforcement learning, implicit gradient, evolutionary strategy, differential evolution, particle swarm, genetic algorithm, simulated annealing, Bayesian optimization, and a variant thereof.

* * * * *